(12) United States Patent
MacKichan et al.

(10) Patent No.: US 9,456,560 B1
(45) Date of Patent: Oct. 4, 2016

(54) TREE AND PLANT WATERING SYSTEMS

(71) Applicant: MACSHAPPIE ENTERPRISES, INC., Canyon Lake, CA (US)

(72) Inventors: David A. MacKichan, San Diego, CA (US); Thomas B. Shappie, Murrieta, CA (US)

(73) Assignee: MacShappie Enterprises, Inc., Canyon Lake, CA (US)

( * ) Notice: Subject to any disclaimer, the term of this patent is extended or adjusted under 35 U.S.C. 154(b) by 116 days.

(21) Appl. No.: 14/105,008

(22) Filed: Dec. 12, 2013

Related U.S. Application Data

(63) Continuation-in-part of application No. 13/043,399, filed on Mar. 8, 2011, now Pat. No. 8,826,588, which is a continuation-in-part of application No. 12/053,175, filed on Mar. 21, 2008, now abandoned.

(60) Provisional application No. 61/736,356, filed on Dec. 12, 2012, provisional application No. 61/753,189, filed on Jan. 16, 2013, provisional application No. 60/896,247, filed on Mar. 21, 2007, provisional application No. 61/365,838, filed on Jul. 20, 2010, provisional application No. 61/394,230, filed on Oct. 18, 2010.

(51) Int. Cl.
*A01G 29/00* (2006.01)

(52) U.S. Cl.
CPC .................................... *A01G 29/00* (2013.01)

(58) Field of Classification Search
CPC ...... A01G 29/00; A01G 25/02; A01G 27/02; A01G 27/06; A01G 27/006

USPC .......... 47/21.1, 29.6, 30, 32, 32.4, 32.7, 33, 47/41.1, 41.14, 45, 46, 47, 70, 75

See application file for complete search history.

(56) References Cited

U.S. PATENT DOCUMENTS

| | | | |
|---|---|---|---|
| 44,238 A * | 9/1864 | Towne | 43/108 |
| 2,105,800 A * | 1/1938 | Watkins | A01G 29/00 405/44 |
| 2,784,528 A | 10/1953 | Rudenauer | |
| 2,782,561 A * | 2/1957 | Smith | 47/21.1 |
| 3,015,448 A * | 1/1962 | Hurless | 239/201 |
| 3,755,965 A | 9/1973 | Emery | |
| 3,788,001 A | 1/1974 | Balfanz, Jr. | |
| 4,348,831 A | 9/1982 | Chambers | |
| 4,642,938 A * | 2/1987 | Georges et al. | 47/2 |
| 4,932,157 A | 6/1990 | Shimp | |
| 4,955,156 A | 9/1990 | Williams | |
| 5,212,905 A | 5/1993 | Philoctete | |
| 5,367,822 A | 11/1994 | Beckham | |
| 5,371,967 A | 12/1994 | Albrecht | |
| 5,465,526 A | 11/1995 | Langley | |
| 5,566,503 A | 10/1996 | Nickson | |
| 5,647,169 A | 7/1997 | Bui | |
| 6,345,466 B1 * | 2/2002 | Venanzi | 47/66.1 |

(Continued)

*Primary Examiner* — Kristen C Hayes
*Assistant Examiner* — Ebony Evans
(74) *Attorney, Agent, or Firm* — Lodestar Patents, PLLC; Raymond J. E. Hall

(57) ABSTRACT

A tree and plant watering system relating to improved transfer of water to trees and plants (both new and existing) is provided. The system comprises soil penetrators, soil anchors, and area extenders to enhance water capacity and to provide ease of water transfer to root systems. Additionally, the system provides plant growth ladders to assist upward plant growth and root apertures to assist root growth.

19 Claims, 16 Drawing Sheets

(56) References Cited

U.S. PATENT DOCUMENTS

| | | |
|---|---|---|
| 6,367,194 B1 | 4/2002 | Measday et al. |
| 6,370,819 B1 | 4/2002 | Reiss et al. |
| 6,976,334 B1 | 12/2005 | Bowditch |
| 7,600,342 B2 * | 10/2009 | Fiveash ............ 47/40.5 |
| 8,776,431 B1 * | 7/2014 | Wiseman et al. ......... 47/39 |
| 2002/0005011 A1 | 1/2002 | Goldberg et al. |
| 2002/0189161 A1 * | 12/2002 | Rice ............ 47/20.1 |
| 2003/0221364 A1 * | 12/2003 | Mello ............ 47/32.7 |

* cited by examiner

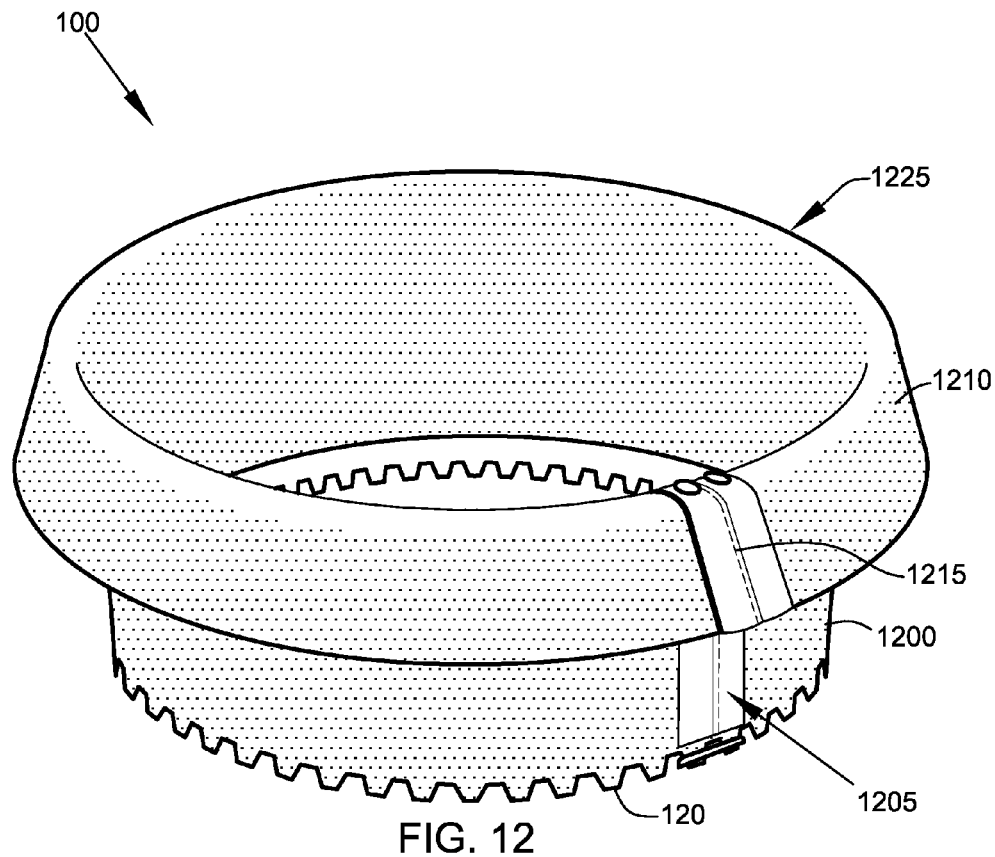
FIG. 12
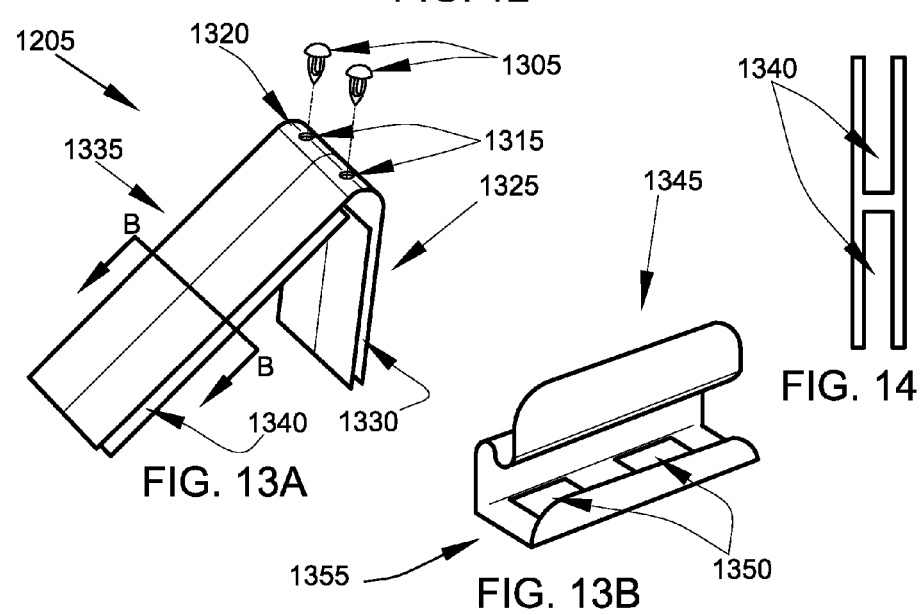
FIG. 13A
FIG. 13B
FIG. 14

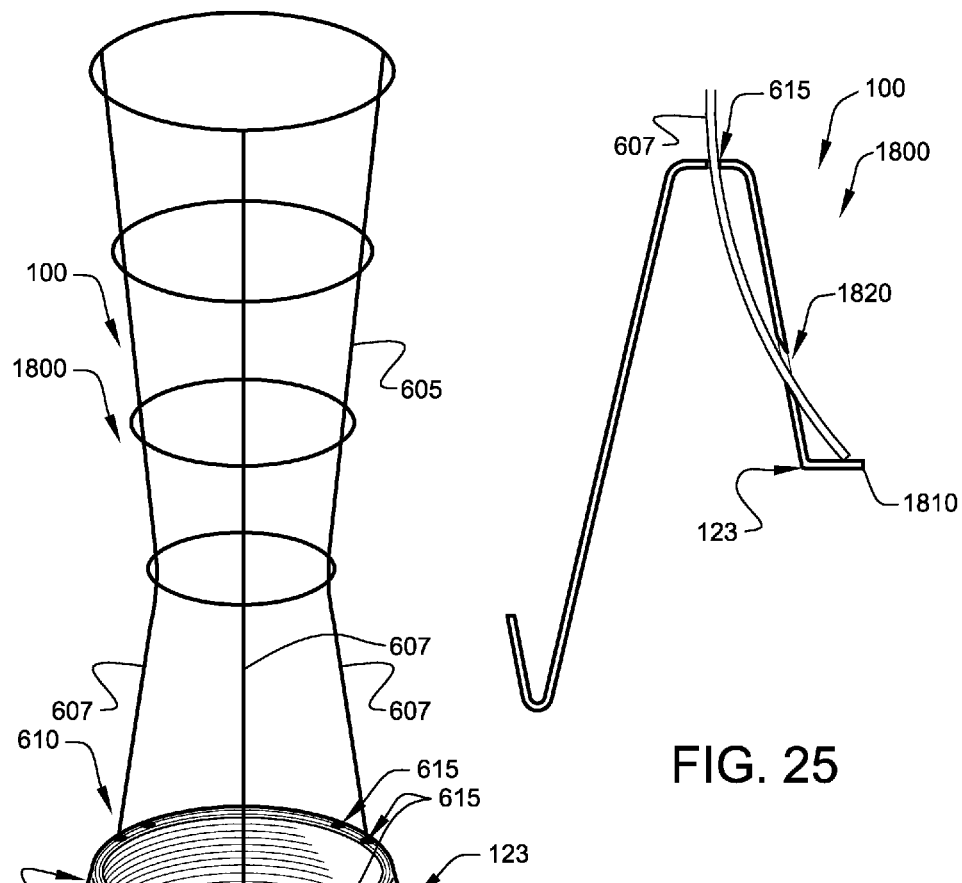
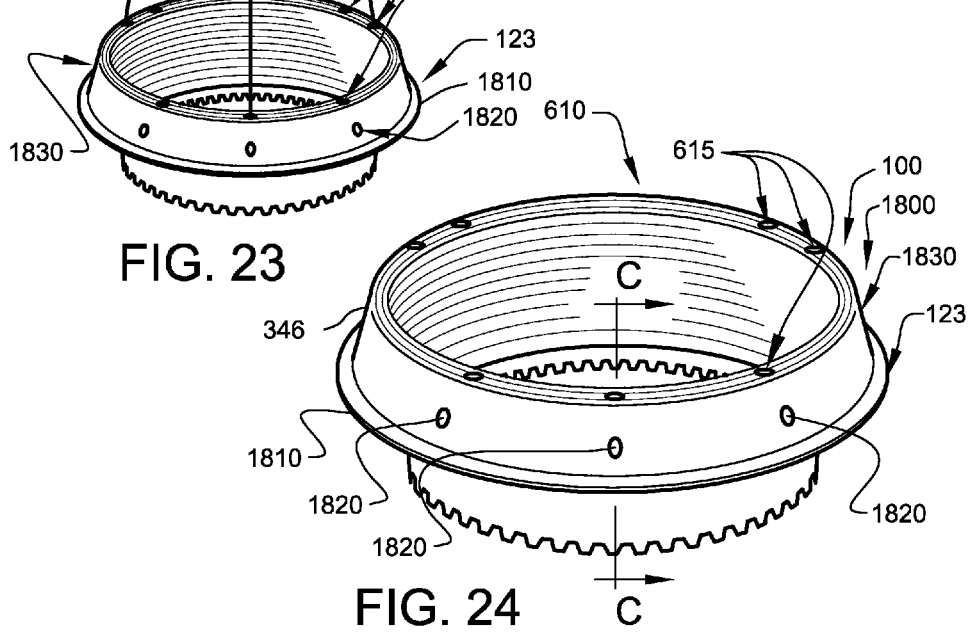
FIG. 23
FIG. 25
FIG. 24

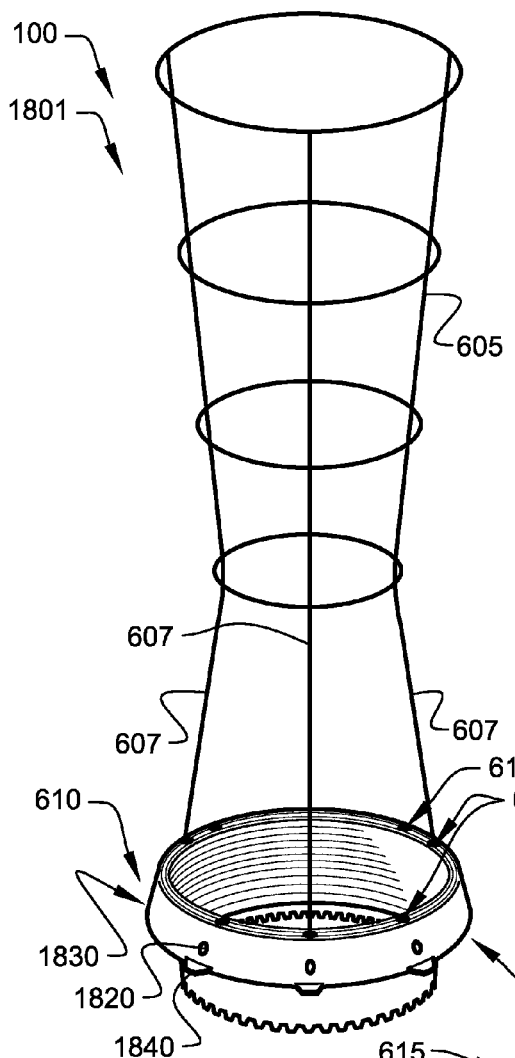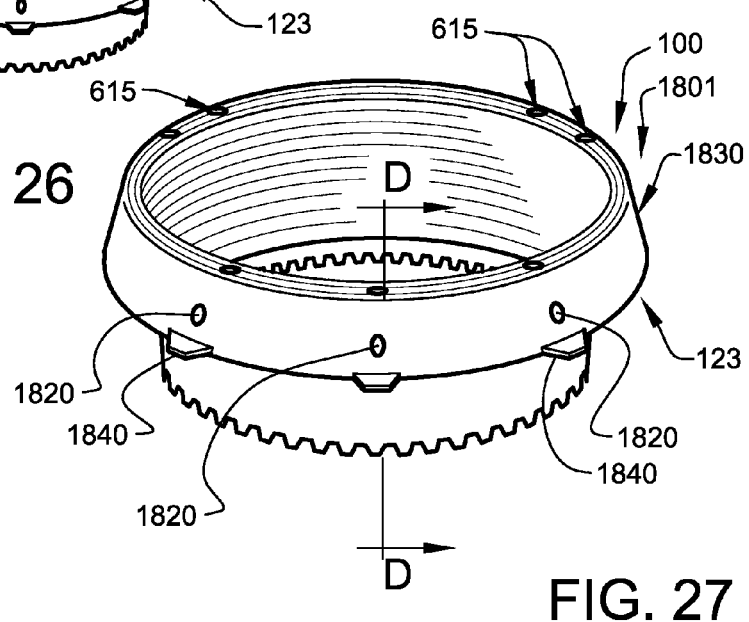
FIG. 26
FIG. 27

TREE AND PLANT WATERING SYSTEMS

CROSS-REFERENCE TO RELATED APPLICATION

The present application is a continuation-in-part of, and is related to and claims priority from, application Ser. No. 13/043,399, filed Mar. 8, 2011, entitled "TREE AND PLANT WATERING SYSTEMS", which is a continuation-in-part of, and is related to and claims priority from, application Ser. No. 12/053,175, filed Mar. 21, 2008, entitled "WATER ROUNDS SYSTEMS", which prior application is related to and claims priority from prior provisional application Ser. No. 60/896,247, filed Mar. 21, 2007, entitled "WATER ROUNDS SYSTEMS"; and, which is related to and claims priority from prior provisional application Ser. No. 61/365,838, filed Jul. 20, 2010, entitled "TREE AND PLANT WATERING SYSTEMS"; and, which is related to and claims priority from prior provisional application Ser. No. 61/394,230, filed Oct. 18, 2010, entitled "TREE AND PLANT WATERING SYSTEMS"; and, this application is related to and claims priority from prior provisional application Ser. No. 61/736,356, filed Dec. 12, 2012, entitled "TREE AND PLANT WATERING SYSTEMS"; and, this application is related to and claims priority from prior provisional application Ser. No. 61/753,189, filed Jan. 16, 2013, entitled "TREE AND PLANT WATERING SYSTEMS", the contents of all of which are incorporated herein by this reference and are not admitted to be prior art with respect to the present invention by the mention in this cross-reference section.

BACKGROUND

This invention relates to plants and other organisms having root systems. More particularly, this invention relates to providing systems for the improved transfer of fluids to plants and other organisms having root systems. Furthermore, this invention relates to successfully containing fluids in the area surrounding plants as well as the area surrounding other organisms having root systems.

Typically, plants are relatively difficult to transfer fluids to, a factor which greatly affects the health and vitality of the plant. Therefore, a need exists for improved fluid transfer, providing greater plant health and vitality specifically through effective fluid containment in the area surrounding plant root systems.

OBJECTS AND FEATURES OF THE INVENTION

A primary object and feature of the present invention is to provide tree and plant watering systems to overcome the above-described problem(s). It is a further object and feature of the present invention to provide such a system comprising containment in the area surrounding plant root systems. A further object and feature of the present invention is to provide such a system comprising soil penetrators. Yet another object and feature of the present invention is to provide such a system comprising soil anchors.

Furthermore, it is an object and feature of the present invention to provide such a system comprising plant protectors, containers, and/or container connectors.

It is another object and feature of the present invention to provide such a system comprising container holders and contoured grips. It is yet another object and feature of the present invention to provide such a system comprising tree and plant watering systems expanders. A further object and feature of the present invention is to provide such a system comprising fluid transmitters. Also, it is an object and feature of the present invention to provide such a system comprising reinforcers.

A further object and feature of the present invention is to provide such a system comprising plant growth ladders. A further object and feature of the present invention is to provide such a system comprising root apertures for promoting root growth beyond such containment. A further object and feature of the present invention is to provide such a system comprising tomato vine cages.

A further object and feature of the present invention is to provide such a system comprising an apparatus capable of being separated to assist being placed around existing plantus and then being coupled together. A further object and feature of the present invention is to provide such a system wherein such apparatus coupling provides a water-holding seal.

Another object and feature of the present invention is to provide such a system having a tilt stabilizer to prevent tilting in loose or muddy soil. A further object and feature of the present invention is to provide such a system having tomato cage orientation stabilizers.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a system, related to assisting at least one fluid from at least one fluid source to at least one plantus embedded in at least one soil, comprising: at least one surrounder structured and arranged to radially surround the at least one plantus; wherein such at least one surrounder comprises at least one container structured and arranged to contain the at least one fluid when such at least one surrounder is embedded in the at least one soil; wherein such at least one surrounder comprises at least one inner surface extending from a near edge, near the at least one soil, to a far edge, away from the at least one soil; wherein such at least one surrounder comprises at least one penetrator structured and arranged to penetrate the at least one soil; and wherein such at least one surrounder comprises at least one separation element, having at least one first end portion and at least one second end portion, structured and arranged to provide separation of such at least one surrounder to assist such radial installation of such at least one surrounder around the at least one plantus.

Moreover, it provides such a system wherein such at least one surrounder comprises: at least one inner ring portion; at least one outer ring portion; and at least one ledge portion connecting such at least one inner ring portion and such at least one outer ring portion; wherein such at least one separation element provides at least one separation to such at least one inner ring portion, such at least one outer ring portion, and such at least one ledge portion; wherein such at least one inner ring portion comprises at least one first connector element structured and arranged to connect such at least one separation element of such at least one inner ring portion; wherein such outer ring portion comprises at least one second connector element structured and arranged to connect such at least one separation element of such at least one outer ring portion; wherein such at least one ledge portion comprises at least one third connector element structured and arranged to connect such at least one separation element of such at least one ledge portion; and wherein when such at least one inner ring portion is connected by such at least one first connector element, such at least one outer ring portion is connected by such at least one second connector element, and such at least one ledge portion is connected by such at least one third connector element such at least one surrounder is not separated.

Additionally, it provides such a system wherein at least one first connector element comprises: at least one first pin structured and arranged to be placed into at least one first pin aperture; wherein such at least one first pin is situate on one of such at least one first end portion or such at least one second end portion end of such at least one separation element; wherein such at least one first pin aperture is situate on the other end of such at least one separation element; and wherein placement of such at least one first pin into such at least one first pin aperture connects such at least one separation element of such at least one inner portion. Also, it provides such a system wherein at least one second connector element comprises: at least one first second pin structured and arranged to be placed into at least one of at least two second pin apertures; at least one second second pin structured and arranged to be placed into at least one other of at least two second pin apertures; wherein such at least one first second pin is situate on one of such at least one first end portion or such at least one second end portion of such at least one separation element; wherein such at least one second second pin is situate on the other end of such at least one separation element; wherein such at least two second pin apertures comprise at least one removable coupling element structured and arranged to couple together such at least one first second pin and such at least one second second pin; and wherein placement of such at least one first second pin into such at least one removable coupling element and such at least one second pin into such into such at least one removable coupling element connects such at least one separation element of such at least one outer portion.

In addition, it provides such a system wherein at least one third connector element comprises: at least one third pin structured and arranged to be placed into at least one third pin aperture; wherein such at least one third pin is situate on one of such at least one first end portion or such at least one second end portion of such at least one separation element; wherein such at least one third pin aperture is situate on the other end of such at least one separation element; and wherein placement of such at least one third pin into such at least one third pin aperture connects such at least one separation element of such at least one ledge portion. And, it provides such a system wherein such at least one removable coupling element comprises at least one clip structured and arranged to connected opposite such at least one first second pin and such at least one second second pin. Further, it provides such a system wherein such at least one surrounder comprises: at least one inner face situate on the innermost diameter of such at least one surrounder; and at least one anchor structured and arranged to anchor such at least one surrounder to the at least one soil; wherein such at least one anchor is situate along such at least one inner face. Even further, it provides such a system wherein such at least one anchor comprises at least one flange situate along such at least one inner face. Even further, it provides such a system wherein such at least one flange comprises at least one sloped portion sloping from such at least one inner face to an about v-shaped edge and sloping upwardly and outwardly therefrom to create at least one trough-shaped flange.

Even further, it provides such a system wherein such at least one surrounder comprises at least one connector structured and arranged to connect such at least one first end portion and such at least one second end portion.

Even further, it provides such a system wherein such at least one connector comprises: at least one channeled connecting member to receive such at least one first end portion and such at least one second end portion; and at least one fastener to secure such at least one channeled connecting member to such at least one surrounder. Even further, it provides such a system wherein such at least one penetrator comprises at least one holder structured and arranged to hold such at least one surrounder during penetration. Even further, it provides such a system wherein such at least one surrounder comprises at least one expander element structured and arranged to expand the fluid capacity of such at least one surrounder. Even further, it provides such a system wherein: such at least one expander element comprises at least one first surrounder layer and at least one second surrounder layer; and such at least one second surrounder layer extends away from such at least one first surrounder layer, expanding the fluid capacity of such at least one surrounder immediately surrounding the at least one plantus. Even further, it provides such a system wherein such at least one surrounder comprises at least one fluid transmitter structured and arranged to transmit at least one fluid from the at least one fluid source. Even further, it provides such a system wherein such at least one penetrator comprises at least one tooth. Even further, it provides such a system wherein such at least one surrounder comprises at least one nested-stacking element structured and arranged to assist nested stacking of a plurality of such at least one surrounders.

In accordance with a preferred embodiment hereof, this invention provides a system, related to providing at least one fluid from at least one fluid source to at least one plantus embedded in at least one soil, comprising: surrounder means for radially surrounding the at least one plantus; wherein such surrounder means comprises container means for containing the at least one fluid; wherein such surrounder means comprises at least one inner surface extending from a near edge, near the at least one soil, to a far edge, away from the at least one soil; and wherein such surrounder means comprises penetrator means for penetrating the at least one soil. Also, it provides such a system wherein such surrounder means comprises protector means for protecting the at least one plantus. In addition, it provides such a system wherein such surrounder means comprises anchor means for anchoring such surrounder means into the at least one soil. And, it provides such a system wherein such surrounder means comprises: at least one first portion; at least one second portion; and connector means for connecting such at least one first portion and such at least one second portion.

Further, it provides such a system wherein such penetrator means comprises holder means for holding such surrounder means during penetration. Even further, it provides such a system wherein such surrounder means comprises expander means for expanding the capacity to contain the at least one fluid. Moreover, it provides such a system wherein such expander means comprises at least one first layer and at least one second layer whereby such at least one second layer extends away from such at least one first layer, providing an increase in the size of the area immediately surrounding the at least one plantus.

Additionally, it provides such a system wherein such surrounder means comprises transmitter means for transmitting the at least one fluid from the at least one fluid source.

Also, it provides such a system wherein such transmitter means comprises at least one sprinkler. In addition, it provides such a system wherein such penetrator means comprises at least one tooth. And, it provides such a system wherein such surrounder means comprises at least one plastic.

In accordance with another preferred embodiment hereof, this invention provides a system, related to providing at least one fluid from at least one fluid source to at least one plantus embedded in at least one soil, comprising: At least one surrounder structured and arranged to radially surround the at least one plantus; wherein such at least one surrounder comprises at least one container structured and arranged to contain the at least one fluid; wherein such at least one surrounder comprises at least one inner surface extending from a near edge, near the at least one soil, to a far edge, away from the at least one soil; and wherein such at least one surrounder comprises at least one penetrator structured and arranged to penetrate the at least one soil. Further, it provides such a system wherein such at least one surrounder comprises at least one protector structured and arranged to protect the at least one plantus. Even further, it provides such a system wherein such at least one surrounder comprises at least one anchor structured and arranged to anchor such at least one surrounder to the at least one soil. Moreover, it provides such a system wherein such at least one surrounder comprises: at least one first portion; at least one second portion; and at least one connector structured and arranged to connect such at least one first portion and such at least one second portion.

Additionally, it provides such a system wherein such at least one penetrator comprises at least one holder structured and arranged to hold such at least one surrounder during penetration. Also, it provides such a system wherein such at least one surrounder comprises at least one expander structured and arranged to expand the capacity to contain the at least one fluid. In addition, it provides such a system wherein such at least one expander comprises at least one first layer and at least one second layer whereby such at least one second layer extends away from such at least one first layer, providing an increase in the size of the area immediately surrounding the at least one plantus. And, it provides such a system wherein such at least one surrounder comprises at least one transmitter structured and arranged to transmit the at least one fluid from the at least one fluid source.

Further, it provides such a system wherein such at least one transmitter comprises at least one sprinkler Even further, it provides such a system wherein such at least one penetrator comprises at least one tooth. Even further, it provides such a system wherein such at least one surrounder comprises at least one plastic. Even further, it provides such a system wherein such at least one holder comprises contours. Even further, it provides such a system whereby such near edge penetrates to a depth greater three inches. Even further, it provides such a system wherein the distance between such near edge and such far edge grades. Even further, it provides such a system wherein such far edge of such at least one surrounder tapers away from the at least one plantus with respect to such near edge. Even further, it provides such a system wherein such near edge is more than three inches from such far edge. Even further, it provides such a system wherein such at least one penetrator comprises at least one kickplate. Even further, it provides such a system wherein said: at least one surrounder comprises at least one anchor structured and arranged to anchor such at least one surrounder to the at least one soil; at least one surrounder comprises at least one plastic; at least one penetrator comprises at least one tooth; and at least one holder comprises contours.

In accordance with a preferred embodiment hereof, this invention provides a system, related to assisting at least one fluid from at least one fluid source to at least one plantus embedded in at least one soil, comprising: at least one surrounder structured and arranged to radially surround the at least one plantus; wherein such at least one surrounder comprises at least one container structured and arranged to contain the at least one fluid when such at least one surrounder is embedded in the at least one soil; wherein such at least one surrounder comprises at least one inner surface extending from a near edge, near the at least one soil, to a far edge, away from the at least one soil; wherein such at least one surrounder comprises at least one penetrator structured and arranged to penetrate the at least one soil; and wherein such at least one surrounder comprises a first plurality of apertures structured and arranged to receive at least one frame ladder structured and arranged to assist upward plant growth. Moreover, it provides such a system further comprising at least one frame ladder attachable to such at least one surrounder and extending upward from such at least one surrounder. Additionally, it provides such a system wherein such at least one frame ladder comprises at least one leg portion structured and arranged to be useable to couple such at least one frame ladder to such at least one surrounder. Also, it provides such a system wherein such first plurality of apertures comprises seven apertures structured and arranged to support at least a three-legged frame or a four-legged frame ladder. In addition, it provides such a system wherein such at least one frame ladder comprises at least one cage structured and arranged to assist upward plant growth. And, it provides such a system wherein such first plurality of apertures are positioned on a top portion of such at least one surrounder. Further, it provides such a system wherein such first plurality of apertures are positioned on a sidewall portion of such at least one surrounder.

Even further, it provides such a system wherein such surrounder further comprises at least one second plurality of apertures structured and arranged to provide passage to laterally expanding plantus roots. Moreover, it provides such a system wherein such at least one surrounder comprises: at least one inner face situate on the innermost diameter of such at least one surrounder; and at least one anchor structured and arranged to anchor such at least one surrounder to the at least one soil; wherein such at least one anchor is situate along such at least one inner face. Additionally, it provides such a system wherein such at least one anchor comprises at least one flange situate along such at least one inner face. Also, it provides such a system wherein such at least one flange comprises at least one sloped portion sloping from such at least one inner face to an about v-shaped edge and sloping upwardly and outwardly therefrom to create at least one trough-shaped flange. In addition, it provides such a system wherein such at least one surrounder comprises: at least one first portion; at least one second portion; and at least one connector structured and arranged to connect such at least one first portion and such at least one second portion. And, it provides such a system wherein such at least one connector comprises: at least one channeled connecting member to receive such at least one first portion and such at least one second portion; and at least one fastener to secure such at least one channeled connecting member to such at least one surrounder.

Further, it provides such a system wherein such at least one connector further comprises two pins insertable into such at least one channeled connecting member and at least one clip connected opposite such two pins. Even further, it provides such a system wherein such at least one penetrator comprises at least one holder structured and arranged to hold such at least one surrounder during penetration. Moreover, it provides such a system wherein such at least one surrounder comprises at least one expander element structured and arranged to expand the fluid capacity of such at least one surrounder. Additionally, it provides such a system wherein: such at least one expander element comprises at least one first surrounder layer and at least one second surrounder layer; and such at least one second surrounder layer extends away from such at least one first surrounder layer, expanding the fluid capacity of such at least one surrounder immediately surrounding the at least one plantus. Also, it provides such a system wherein such at least one surrounder comprises at least one fluid transmitter structured and arranged to transmit at least one fluid from the at least one fluid source. In addition, it provides such a system wherein such at least one fluid transmitter comprises at least one sprinkler And, it provides such a system wherein such at least one penetrator comprises at least one tooth.

In accordance with another preferred embodiment hereof, this invention provides a system, related to assisting at least one fluid from at least one fluid source to at least one plantus embedded in at least one soil, comprising: at least one surrounder structured and arranged to radially surround the at least one plantus; wherein such at least one surrounder comprises at least one container structured and arranged to contain the at least one fluid when such at least one surrounder is embedded in the at least one soil; wherein such at least one surrounder comprises at least one inner surface extending from a near edge, near the at least one soil, to a far edge, away from the at least one soil; wherein such at least one surrounder comprises at least one penetrator structured and arranged to penetrate the at least one soil; wherein such at least one surrounder comprises at least one protector structured and arranged to protect the at least one plantus; wherein such at least one surrounder comprises at least one anchor structured and arranged to anchor such at least one surrounder to the at least one soil; and wherein such at least one penetrator comprises at least one holder structured and arranged to hold such at least one surrounder during penetration.

In accordance with another preferred embodiment hereof, this invention provides a system, related to assisting at least one fluid from at least one fluid source to at least one plantus embedded in at least one soil, comprising: surrounder means for radially surrounding the at least one plantus; wherein such surrounder means comprises container means for containing the at least one fluid; wherein such surrounder means comprises at least one inner surface extending from a near edge, near the at least one soil, to a far edge, away from the at least one soil; and wherein such surrounder means comprises penetrator means for penetrating the at least one soil.

In accordance with a preferred embodiment hereof, this invention provides a system, related to assisting at least one fluid from at least one fluid source to at least one plantus embedded in at least one soil, comprising: at least one surrounder structured and arranged to radially surround the at least one plantus; wherein such at least one surrounder comprises at least one container structured and arranged to contain the at least one fluid when such at least one surrounder is embedded in the at least one soil; wherein such at least one surrounder comprises at least one inner surface extending from a near edge, near the at least one soil, to a far edge, away from the at least one soil; wherein such at least one surrounder comprises at least one penetrator structured and arranged to penetrate the at least one soil; wherein such at least one surrounder comprises at least one protector structured and arranged to protect the at least one plantus; wherein such at least one surrounder comprises at least one anchor structured and arranged to anchor such at least one surrounder to the at least one soil; and wherein such at least one penetrator comprises at least one holder structured and arranged to hold such at least one surrounder during penetration.

Moreover, it provides such a system wherein such at least one surrounder comprises a first plurality of apertures structured and arranged to receive at least one frame ladder structured and arranged to assist upward plant growth. Additionally, it provides such a system further comprising at least one frame ladder attachable to such at least one surrounder and extending upward from such at least one surrounder. Also, it provides such a system wherein such at least one frame ladder comprises at least one leg portion structured and arranged to be useable to couple such at least one frame ladder to such at least one surrounder. In addition, it provides such a system wherein such first plurality of apertures comprises seven apertures structured and arranged to support at least a three-legged frame or a four-legged frame ladder. And, it provides such a system wherein such at least one frame ladder comprises at least one cage structured and arranged to assist upward plant growth.

Further, it provides such a system wherein such first plurality of apertures are positioned on a top portion of such at least one surrounder. Even further, it provides such a system wherein such first plurality of apertures are positioned on a sidewall portion of such at least one surrounder. Moreover, it provides such a system wherein such surrounder further comprises at least one second plurality of apertures structured and arranged to provide passage to laterally expanding plantus roots. Additionally, it provides such a system wherein such at least one anchor comprises at least one flange situate along such at least one inner face.

Also, it provides such a system wherein such at least one flange comprises at least one sloped portion sloping from such at least one inner face to an about v-shaped edge and sloping upwardly and outwardly therefrom to create at least one trough-shaped flange. In addition, it provides such a system wherein such at least one surrounder comprises: at least one first portion; at least one second portion; and at least one connector structured and arranged to connect such at least one first portion and such at least one second portion. And, it provides such a system wherein such at least one connector comprises: at least one channeled connecting member to receive such at least one first portion and such at least one second portion; and at least one fastener to secure such at least one channeled connecting member to such at least one surrounder. Further, it provides such a system wherein such at least one connector further comprises two pins insertable into such at least one channeled connecting member and at least one clip connected opposite such two pins. Even further, it provides such a system wherein such at least one penetrator comprises at least one holder structured and arranged to hold such at least one surrounder during penetration. Even further, it provides such a system wherein such at least one surrounder comprises at least one expander element structured and arranged to expand the fluid capacity of such at least one surrounder.

Even further, it provides such a system wherein: such at least one expander element comprises at least one first surrounder layer and at least one second surrounder layer; and such at least one second surrounder layer extends away from such at least one first surrounder layer, expanding the fluid capacity of such at least one surrounder immediately surrounding the at least one plantus. Even further, it provides such a system wherein such at least one surrounder comprises at least one fluid transmitter structured and arranged to transmit at least one fluid from the at least one fluid source. Even further, it provides such a system wherein such at least one fluid transmitter comprises at least one sprinkler Even further, it provides such a system wherein such at least one penetrator comprises at least one tooth. Even further, it provides such a system wherein such at least one surrounder comprises at least one nested-stacking element structured and arranged to assist nested stacking of a plurality of such at least one surrounders.

In accordance with another preferred embodiment hereof, this invention provides each and every novel feature, element, combination, step and/or method disclosed or suggested by this patent application.

BRIEF DESCRIPTION OF THE DRAWINGS

FIG. 12 shows a perspective view, illustrating another preferred embodiment of water rounds system which may be installed around an existing tree or plant comprising a connection assembly, according to a preferred embodiment of the present invention.

FIG. 13A shows a connecting member of another preferred embodiment of water rounds system.

FIG. 13B shows a preferred coupler according to the preferred embodiment of FIG. 12.

FIG. 14 shows a cross-sectional view of the section B-B of FIG. 13A.

FIG. 23 shows a front perspective view of a water round of the water rounds system comprising a tomato cage, according to a preferred embodiment of the present invention.

FIG. 24 shows an enlarged front perspective view of a water round of the water rounds system utilized with a tomato cage, according to a preferred embodiment of FIG. 23.

FIG. 25 shows a cross-sectional view of section C-C of FIG. 24.

FIG. 26 shows a front perspective view of a water round of the water rounds system comprising a tomato cage, according to a preferred embodiment of the present invention.

FIG. 27 shows an enlarged front perspective view of a water round of the water rounds system utilized with a tomato cage, according to a preferred embodiment of FIG. 26.

DETAILED DESCRIPTION OF THE BEST MODES AND PREFERRED EMBODIMENTS OF THE INVENTION

Figure 1A:
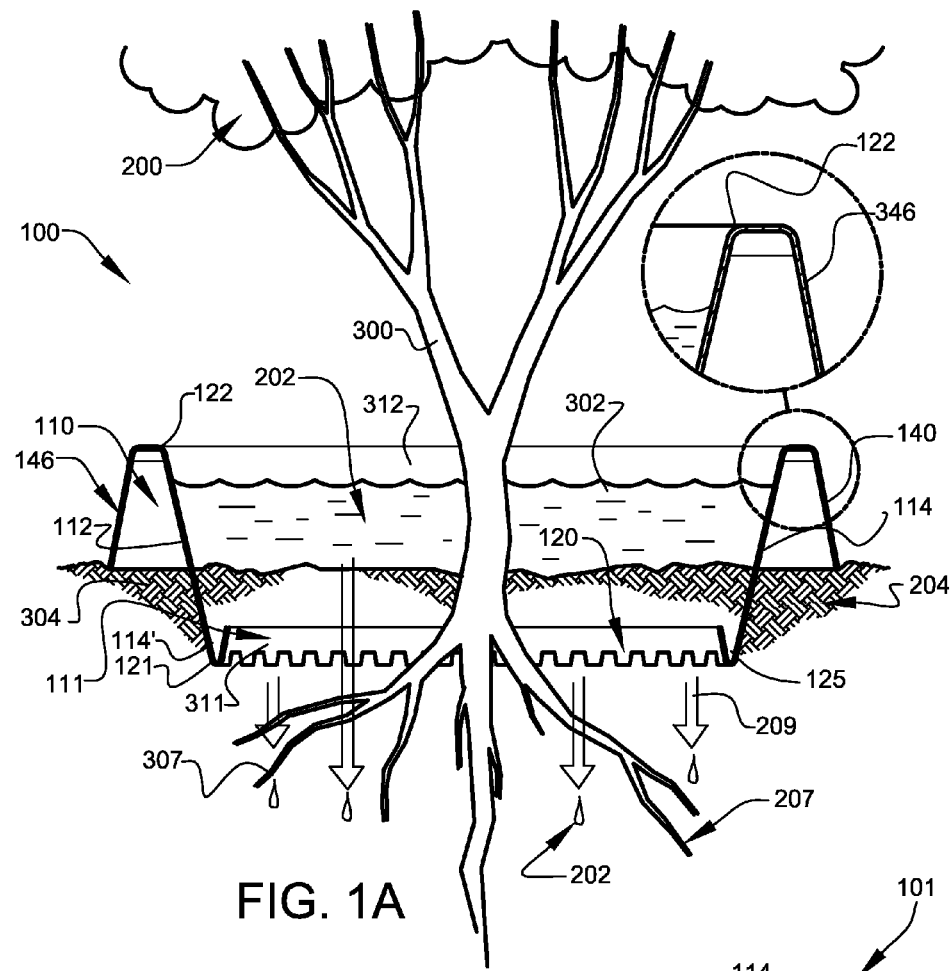
FIG. 1A shows a cross-sectional view of the water rounds system, according to a preferred embodiment of the present invention.

FIG. 1A shows a cross-sectional view of a water rounds system 100 according to a preferred embodiment of the present invention. Water rounds system 100 is preferably related to providing a fluid 202 from a fluid source 208 (best viewed on FIG. 2A) a plantus 200 embedded in soil 204. Water rounds system 100 preferably provides increased exposure of fluid 202 to roots 207, providing a slow, deep, penetrating irrigation to plantus 200. Water rounds system 100 preferably also allows plantus 200 to become stronger, healthier, and more stable, as the roots 207 of plantus 200 will preferably be more deeply established as the roots preferably will follow the gravitational path 209 of fluid 202 deeper into soil 204, and will be provided with more root surface area exposure to fluid 202, as well as greater access to deeper and richer soil 204.

Based on Robert Whittaker's Five-Kingdom System, plantus 200 preferably comprises kingdom plantae, kingdom fungi, kingdom protista, and kingdom monera. More specifically, plantus 200 preferably comprise plants 300, preferably plants 300 comprising plant roots 307, as shown. Upon reading the teachings of this specification, those of ordinary skill in the art will now understand that, under appropriate circumstances, considering such issues as biology, technology, etc., other plantus, such as, trees, shrubs, herbs, vegetables, mushrooms, other living things requiring exposure to fluids, other living things comprising root systems, etc., may suffice.

Soil 204 preferably comprises planting soil 304, as shown. Upon reading the teachings of this specification, those of ordinary skill in the art will now understand that, under appropriate circumstances, considering such issues as conditions, geography, plantus, climate, convenience, cost, market demand, technology, etc., other soils, such as, dirt, sand, grain, gravel, other granular materials, other root system supporting mediums, etc., may suffice.

Fluid 202 preferably comprises water 302, preferably mostly water, as shown. Upon reading the teachings of this specification, those of ordinary skill in the art will now understand that, under appropriate circumstances, considering such issues as soil, plantus, climate, convenience, cost, market demand, technology, etc., other fluids, such as, Miracle-Gro®, fluids comprising nutrients, other mixtures, etc., may suffice.

Figure 1B:
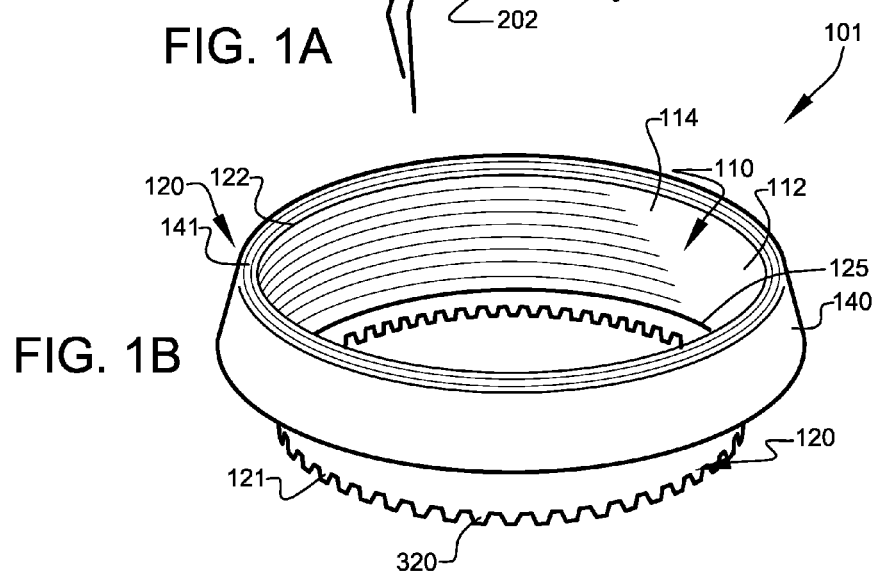
FIG. 1B shows a perspective view of a water round apparatus, according to the preferred embodiment of FIG. 1A.

FIG. 1B shows a perspective view of a water round apparatus 101, according to the preferred embodiment of FIG. 1A.

System apparatus 101 preferably comprises surrounder 110 and penetrator 120, as shown. Surrounder 110 (at least herein embodying surrounder means for radially surrounding the at least one plantus) preferably comprises a radial surrounder 110, with respect to plantus 200, as shown. Surrounder 110 preferably comprises at least one container 112 (at least herein embodying container means for containing the at least one fluid), preferably able to hold a fluid 202 in container 112, preferably when such container 112 is anchored to planting soil 304, preferably preventing fluid 202 from escaping the area surrounding roots 207, as shown.

Container 112 preferably comprises reservoir 312, as best shown in FIG. 1A. Surrounder 110 preferably comprises inner surface 114, extending from a near edge 121 near soil 206, to a far edge 122 away from soil 206. Near edge 121 comprises inner face 114' preferably comprising a portion of inner surface 114. Preferably, near edge 121 is more than approximately three inches from far edge 122, so as to preferably provide at least three inches of penetration depth. In addition, far edge 122 preferably tapers away from plantus 200 with respect to near edge 121, preferably providing a v-shaped cross-section, so as to provide greater containment capacity while funneling fluid 202 over roots 207, as best shown in FIG. 1A.

Penetrator 120 (at least herein embodying penetrator means for penetrating the at least one soil) preferably penetrates soil 204, preferably so as to prevent fluid 202 from leaking out from under the near edge 121 of container 112, as shown. Penetrator 120 preferably comprises holder 140 (at least herein embodying holder means for holding said surrounder means during penetration), preferably a holder 140 comprising contours 141, preferably so as to permit a user of system apparatus 101 to hold surrounder 110 during penetration, preferably penetration by twisting and pressing surrounder 110 into soil 204. Penetrator 120 preferably comprises teeth 320, preferably along near edge 121, preferably such that near edge 121 may penetrate to a depth of at least about three inches. Upon reading the teachings of this specification, those of ordinary skill in the art will now understand that, under appropriate circumstances, considering such issues as soil, cost, convenience, market demand, technology, etc., other penetrators, such as, spikes, hooks, sharp edges, other non-teeth, etc., may suffice.

As best shown in FIG. 1A, surrounder 110 preferably comprises an anchor 111 (at least herein embodying anchor means for anchoring said surrounder means into the at least one soil), preferably at least one anchoring protrusion 311, so as to provide anchoring of surrounder 110 into soil 204, as shown. Anchor 111 preferably comprises an upwardly-facing V-shaped flange 125, preferably encircling the inner diameter of surrounder 110, as shown. In such manner, a user may manipulate the surrounder 110 to preferably penetrate the soil with teeth 320, preferably by rotation of the surrounder or "sawing" motion. This arrangement provides utilizing the smallest outer circumference of surrounder 110; and, comprises at least anchoring along the inner surrounder circumference by upwardly-facing V-shaped flange 125 which preferably "pushes" against the soil to keep the surrounder anchored in place once buried into the soil. Upon reading the teachings of this specification, those of ordinary skill in the art will now understand that, under appropriate circumstances, considering such issues as soil, market demand, cost, technology, etc., other anchor geometries, such as, U-shaped, W-shaped, etc., may suffice. In addition, upon reading this specification, those with ordinary skill in the art will now appreciate that, under appropriate circumstances, considering such issues as design preference, user preferences, marketing preferences, cost, structural requirements, available materials, technological advances, etc., other added anchor arrangements such as, for example, hooks, spikes, attachers, adhesives, other non-kicks, etc., may suffice.

As best shown in FIG. 1A, surrounder 110 preferably comprises protector 146 (at least herein embodying protector means for protecting the at least one plantus), preferably walls 346 (see inset on FIG. 1A), preferably comprising plastic, as shown, preferably so as to protect plantus 200 from debris, erosion, etc., as shown. Upon reading the teachings of this specification, those of ordinary skill in the art will now understand that, under appropriate circumstances, considering such issues as cost, convenience, market demand, technology, etc., other protectors, such as, blockers, shields, barriers, other non-wall configurations, etc., may suffice. Further, upon reading this specification, those with ordinary skill in the art will now appreciate that, under appropriate circumstances, considering such issues as manufacturing preference, cost, structural requirements, available materials, technological advances, etc., other materials for walls 346 such as, carbon-fiber, galvanized steel, fiberglass, etc., may suffice.

Preferred embodiments of surrounder 110 comprise a range of different diameters to work with various types of plants and trees. Preferably, such diameters will vary depending on the diameter and root system of the respective plants. Preferred embodiments of surrounder 110 will also further preferably comprise various color options, such as, colored plastic, colored parts, etc.

Figure 2A:
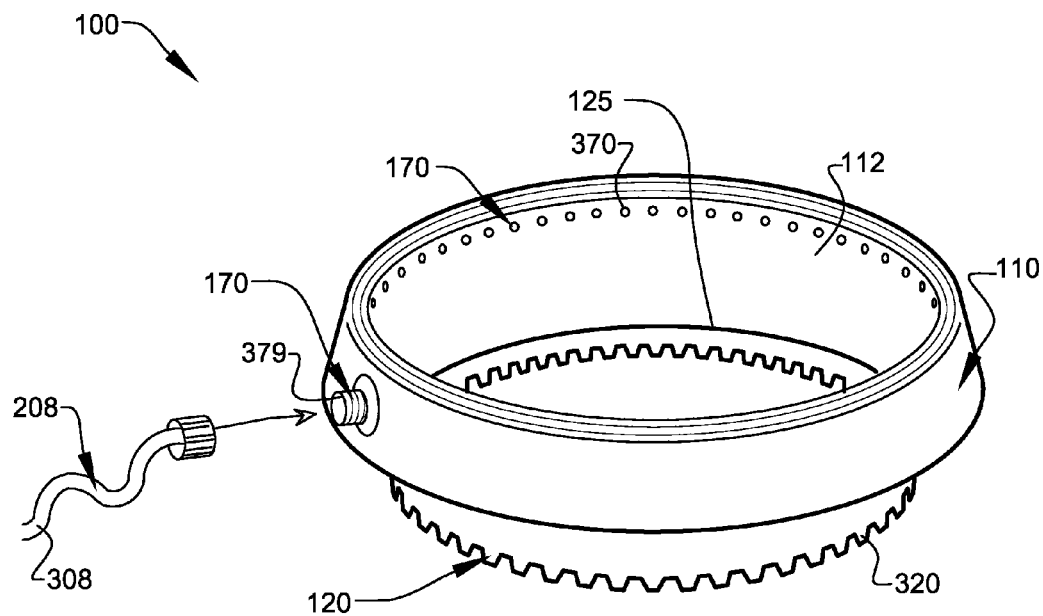
FIG. 2A shows a perspective view of a water round apparatus transmitter, prior to use, according to another preferred embodiment of the present invention.
Figure 2B:
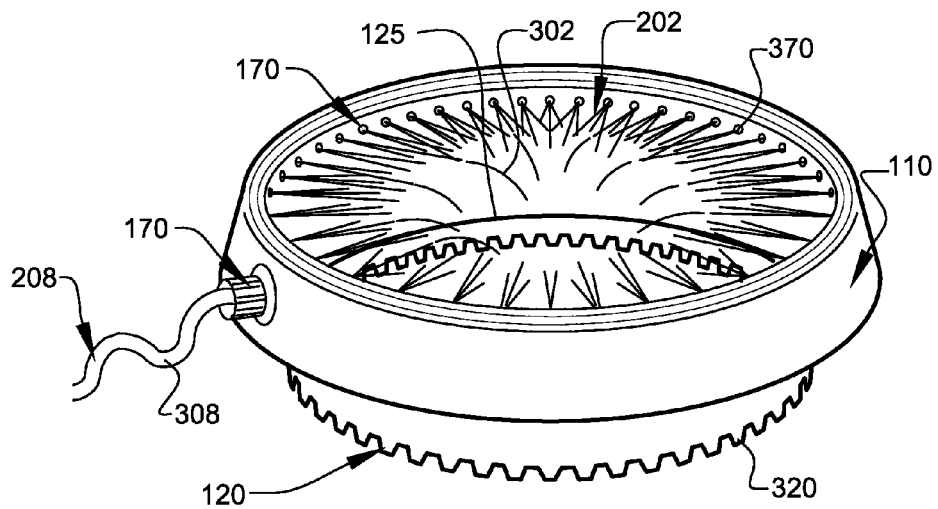
FIG. 2B shows a perspective view of a water round apparatus transmitter, in use, according to the preferred embodiment of FIG. 2A.

FIG. 2A shows a perspective view of a water round apparatus water transmitter 170, prior to use, according to another preferred embodiment of the present invention. FIG. 2B shows a perspective view of a water round apparatus transmitter 170, in use, according to the preferred embodiment of FIG. 2A. In the preferred embodiment of FIG. 2, surrounder 110 preferably comprises a transmitter 170 (at least herein embodying transmitter means for transmitting the at least one fluid from the at least one fluid source) that preferably transmits fluid 202, preferably water, preferably from fluid source 208, preferably to the area surrounding plantus 200, as shown. Water rounds system apparatus transmitter 170 preferably comprises a sprinkler 370. In addition, water rounds system apparatus transmitter 170 preferably comprises an intake 379. Sprinkler 370 preferably sprinkles fluid 202 onto the soil 204 surrounding roots 207. Alternatively preferably, water rounds system apparatus transmitter 170 could be directed away from surrounder 110, so as to transmit fluid 202 to areas outside of reservoir 312, such as to surrounding plantus 200. Alternatively preferably, water rounds system apparatus transmitter 170 could transmit fluid 202 to a plurality of surrounders 110, preferably "daisy-chained" along a water hose, preferably, such that fluid 202 transmits to a plurality of surrounders 110 simultaneously controlled by a single nozzle or fluid source 208. Upon reading the teachings of this specification, those of ordinary skill in the art will now understand that, under appropriate circumstances, considering such issues as cost, convenience, market demand, technology, etc., other transmitters, such as, drips, valves, sprayers, other sprinkler configurations, etc., may suffice.

Fluid source 208 preferably comprises at least one hose 308, preferably a garden hose connected to a pressurized water source, such as a residential or commercial plumbing system, as shown in FIGS. 2A and 2B. Upon reading the teachings of this specification, those of ordinary skill in the art will now understand that, under appropriate circumstances, considering such issues as cost, convenience, market demand, technology, etc., other fluid sources, such as, faucets, nozzles, valves, funnels, bowls, other fluid dispensers, water tanks, etc., may suffice.

Figure 3:
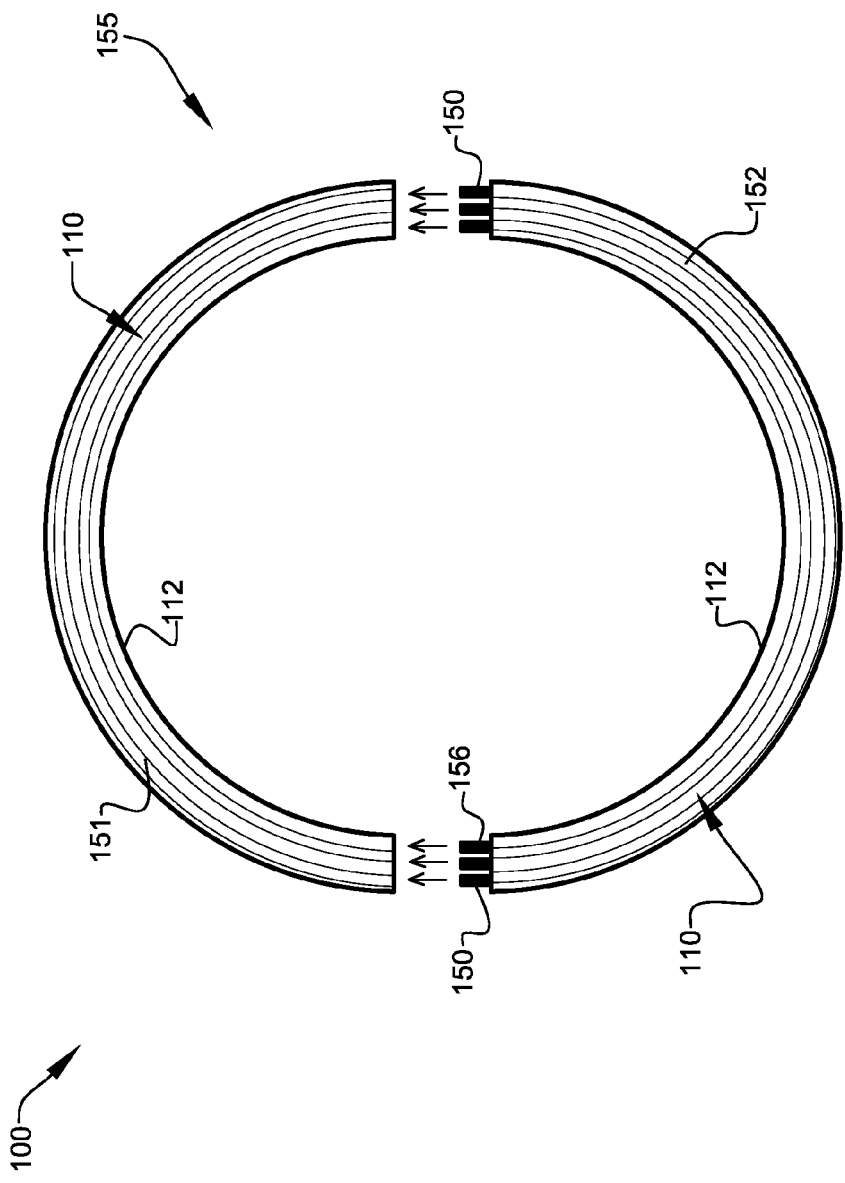
FIG. 3 shows a top view of a water round apparatus, according to another preferred embodiment of the present invention.

FIG. 3 shows a top view of a water round apparatus 155 according to another preferred embodiment of the present invention. In the preferred embodiment of FIG. 3, surrounder 110 preferably comprises first portion 151, second portion 152, and connector 150. Connector 150 (at least herein embodying connector means for connecting said at least one first portion and said at least one second portion) preferably comprises plugs 156, preferably so as to permit first portion 151 to connect to second portion 152, preferably so as to provide ease of installation and removal from plantus 200, in particular where plantus 200 is too large to lift surrounder 110 up, over and off of plantus 200. Upon reading the teachings of this specification, those of ordinary skill in the art will now understand that, under appropriate circumstances, considering such issues as cost, convenience, market demand, technology, etc., other connectors, such as engagers, clips, hooks, sliders, ties, other non-plugs, etc., may suffice.

Figure 4:
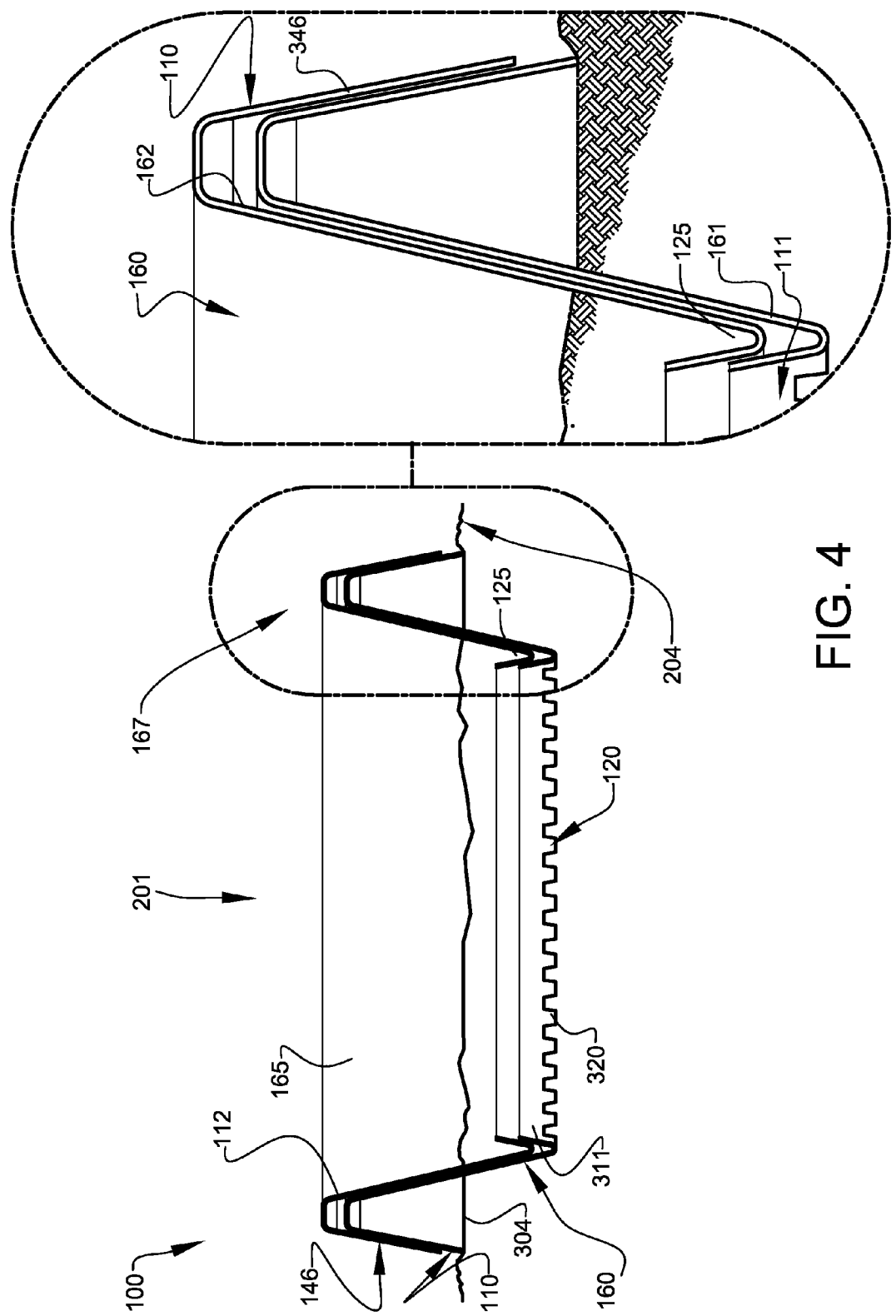
FIG. 4 shows a cross-sectional view of a water round apparatus, according to another preferred embodiment of the present invention.

FIG. 4 shows a cross-sectional view of a water round apparatus 201 according to another preferred embodiment of the present invention. In the preferred embodiment of FIG. 4, surrounder 110 preferably comprises expander 160 (at least herein embodying expander means for expanding the capacity to contain the at least one fluid), preferably so as to provide expanded fluid 202 capacity. Expander 160 preferably comprises extender 165, preferably comprising a first layer 161 and a second layer 162, whereby second layer 162 extends away from first layer 161, providing an increase in the size of the containment area around plantus 200. Upon reading the teachings of this specification, those of ordinary skill in the art will now understand that, under appropriate circumstances, considering such issues as cost, convenience, market demand, technology, etc., other expanders, such as, coils, inflators, other non-extenders, etc., may suffice.

Additionally, FIG. 4 illustrates that multiple water rounds may be stacked or nested closely adjacent to one another, as shown by first layer 161 and a second layer 162 stacking/nesting. Preferably, such stacking/nesting 167 provides benefit for retail sales (more product in less space) and shipping advantage (more product in less packaging space). The above described arrangement and illustrated drawings at least embodying herein, wherein said at least one surrounder comprises at least one nested-stacking element structured and arranged to assist nested stacking of a plurality of said at least one surrounders.

Figure 5:
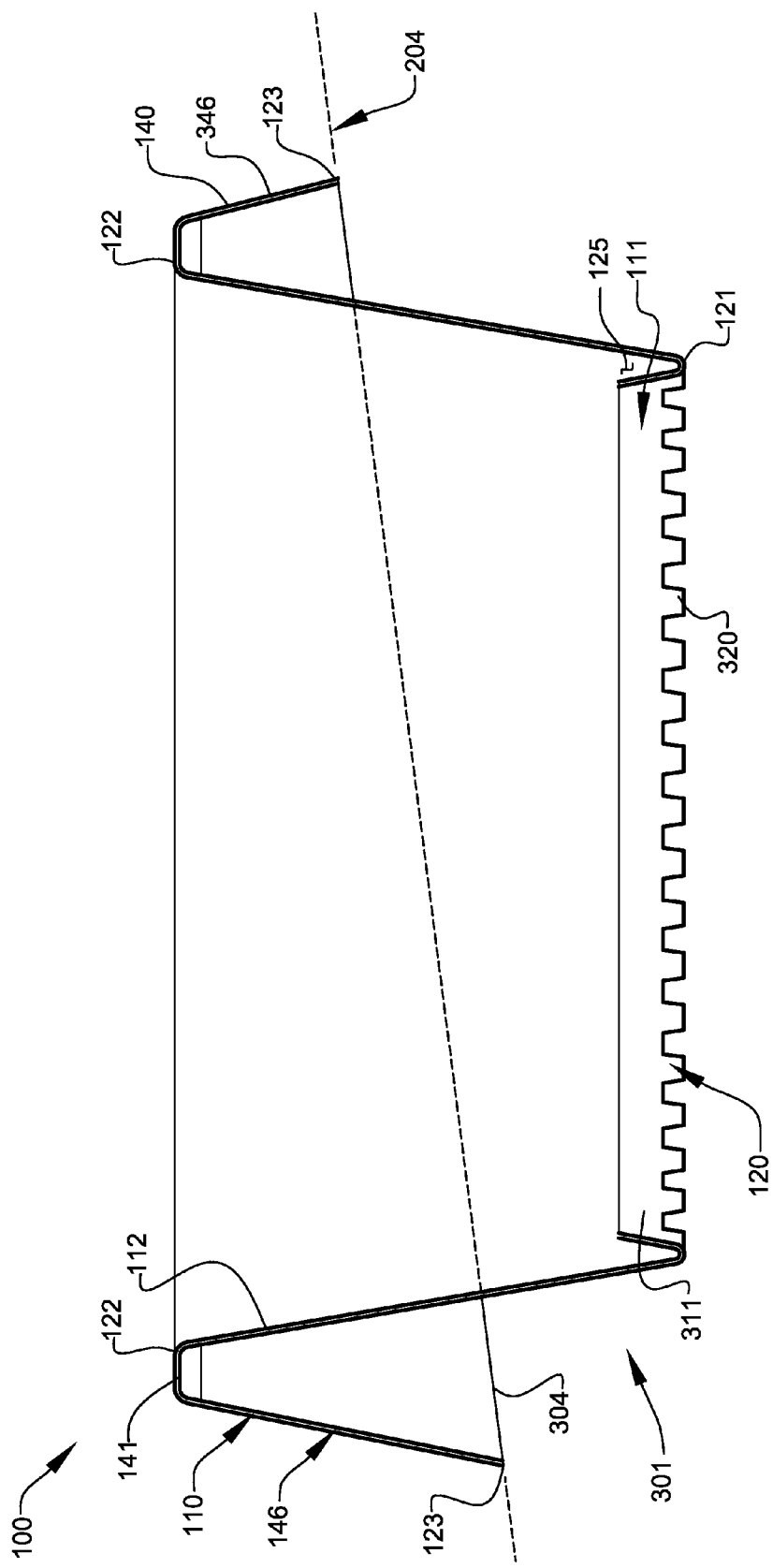
FIG. 5 shows a cross-sectional view of a water round apparatus, according to another preferred embodiment of the present invention.

FIG. 5 shows a cross-sectional view of a water round apparatus 301 according to another preferred embodiment of the present invention. Preferably, the distance between an outer edge 123 and far edge 122, slopes, so as to provide for adequate containment where a plantus 200 is, for example, on a hillside, preferably so as to accommodate the particular degree of the hillside, as shown. In other words, in this example scenario, the downhill side of surrounder 110 is thicker than the uphill side of surrounder 110, as shown in FIG. 5. Upon reading this specification, those with ordinary skill in the art will now appreciate that, under appropriate circumstances, considering such issues as manufacturing preference, cost, structural requirements, available materials, technological advances, etc., other sloping arrangements such as, angled edges, taller and shorter walls, etc., may suffice.

Figure 6:
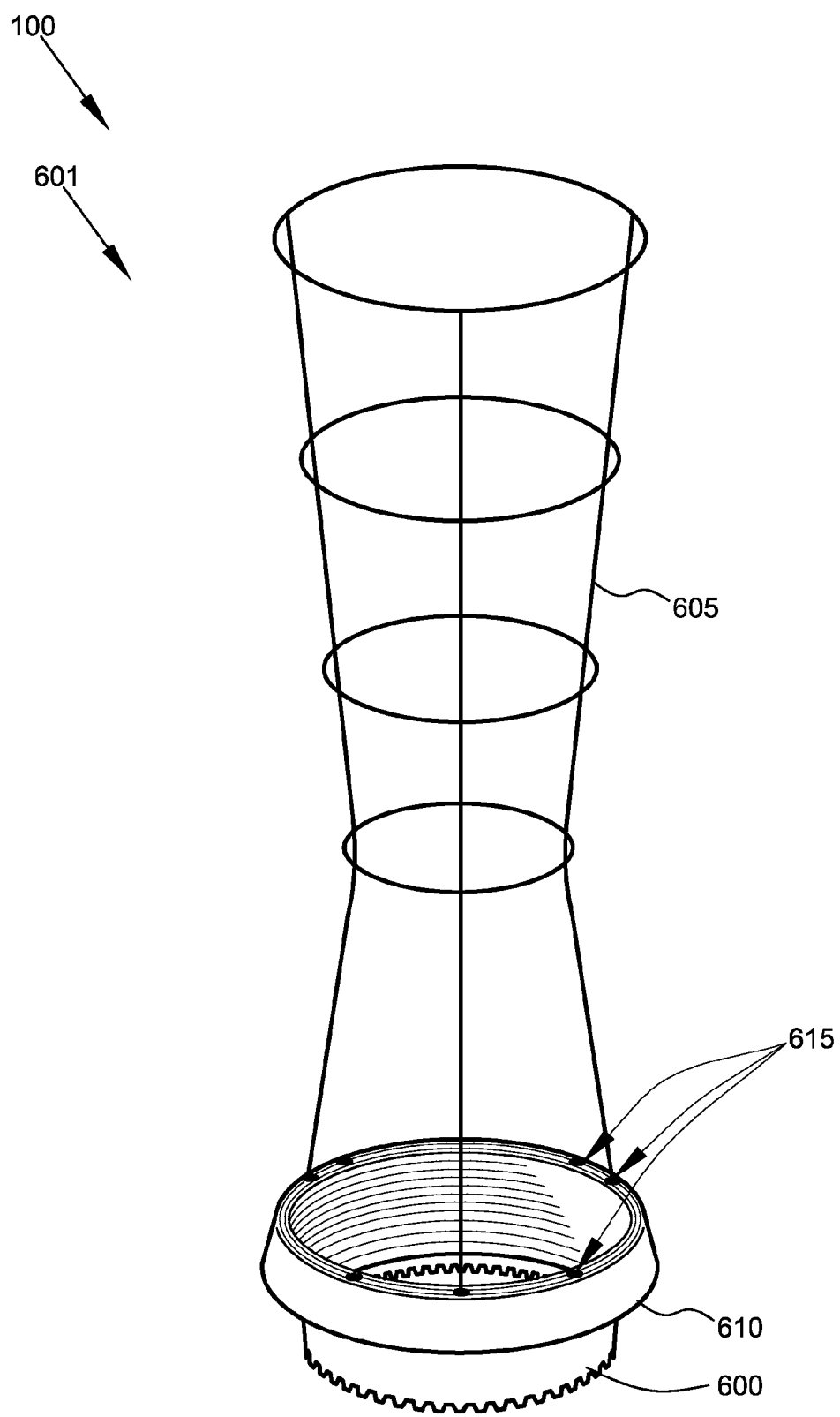
FIG. 6 shows a front view of a water round of the water rounds system comprising a tomato cage, according to a preferred embodiment of the present invention.
Figure 9:
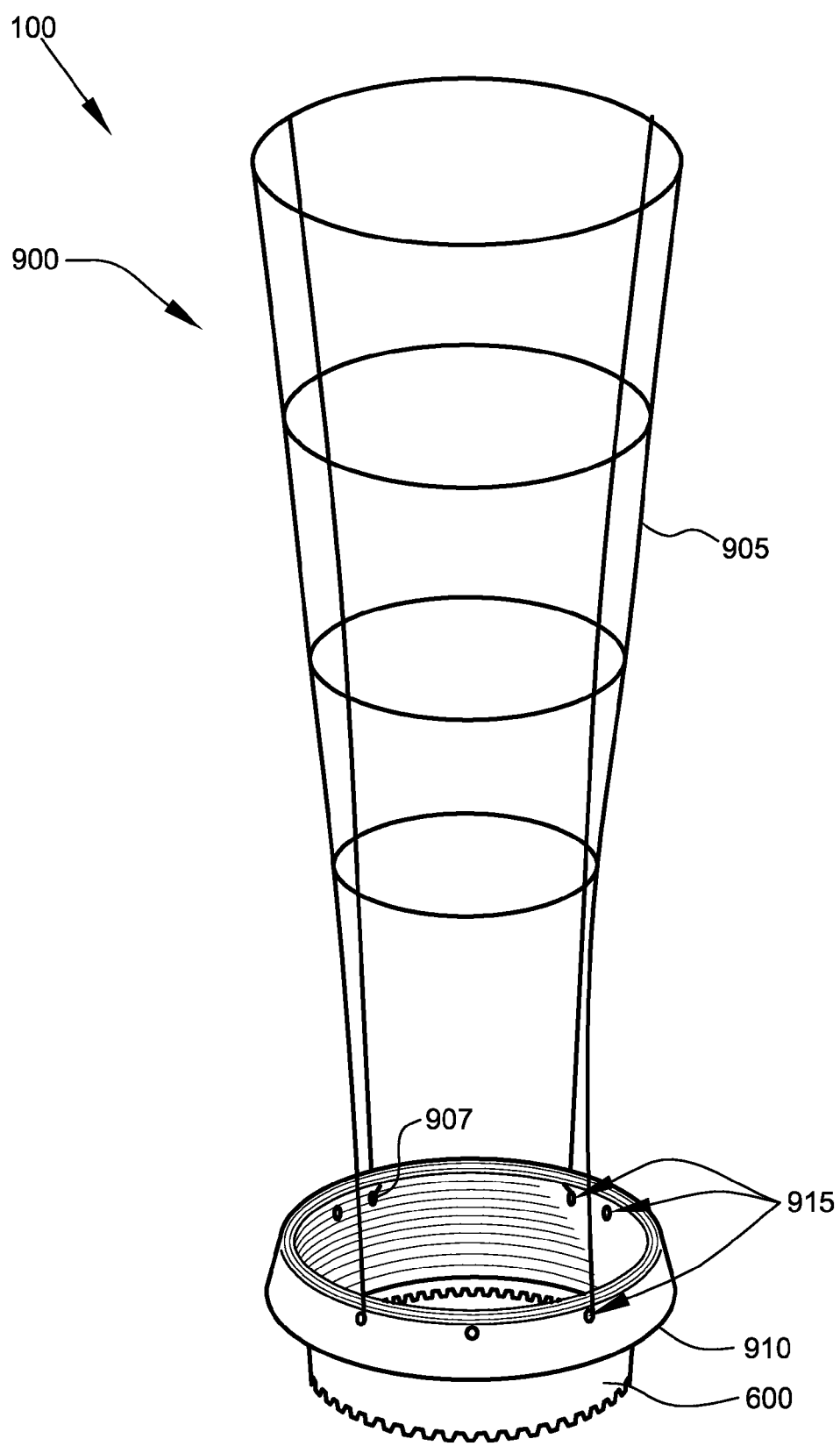
FIG. 9 shows a front view of a water round comprising a tomato cage, according to another preferred embodiment of the present invention.

FIG. 6 shows a front view of a water round of the water rounds system 100 comprising a cage 605, according to a preferred embodiment of the present invention. FIG. 6 shows water rounds embodiment 601. Water rounds embodiment 601 preferably comprises base 610 (system apparatus 101 as shown in FIG. 1B), cage 605, and apertures 615, as shown. Cage 605 provides a frame ladder or scaffold for plants such as tomato plants, preferably at least tomato plants. Alternately preferably, water rounds embodiment 601 preferably comprises at least one frame ladder (not necessarily a cage) circumferential with the water round. FIG. 6 shows a three-legged cage. The aperture arrangement (described more particularly in FIG. 7) may also accept a four-legged cage as shown in FIG. 9. Upon reading this specification, those with ordinary skill in the art will now appreciate that, under appropriate circumstances, considering such issues as design preference, user preferences, marketing preferences, cost, structural requirements, available materials, technological advances, etc., other cage arrangements such as, for example, more or less legs, other attachment means, etc., may suffice.

Preferably, base 610 contains preferably seven of apertures 615 arranged on the top portion of base 600, as shown. Upon reading this specification, those with ordinary skill in the art will now appreciate that, under appropriate circumstances, considering such issues as design preference, user preferences, marketing preferences, cost, structural requirements, available materials, technological advances, etc., other aperture arrangements such as, for example, other numbers of apertures, other aperture geometries, etc., may suffice. Under appropriate circumstances, other numbers of apertures 615 may suffice. The apertures are sized to accept the legs of cage 605, as shown. Apertures 615 are preferably about one-quarter inch in diameter. Under appropriate circumstances, other aperture diameters may suffice. The legs of cage 605 preferably extend into surrounder 110 (see FIG. 1A). In use, water rounds embodiment 601 is preferably placed into the ground surrounding a tomato plant or vegetable plant to support the growth of the plant. The configuration of base 610 assists in delivering water to the root system of the surrounded plant as discussed herein. Base 610 is preferably circular in construction with a preferred diameter of about 16 inches. Under appropriate circumstances, other diameters (larger or smaller) of base may suffice.

Figure 7:
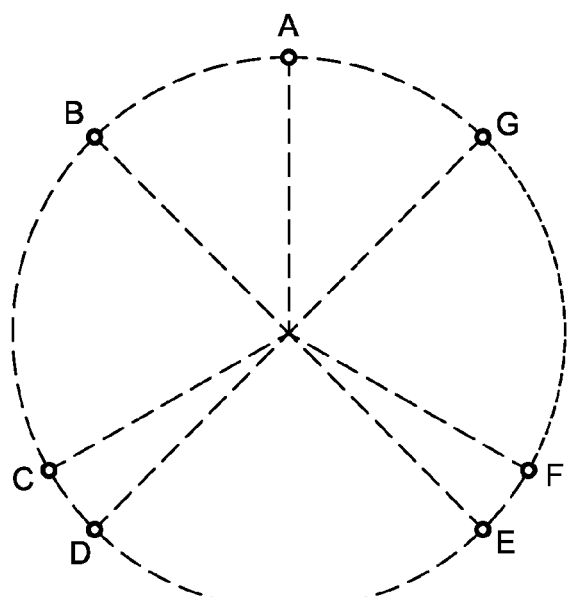
FIG. 7 shows a schematic illustration showing the relationship of apertures of a water round of FIG. 6 and FIG. 9, according to a preferred embodiment of the present invention.

FIG. 7 shows a schematic illustration showing the relationship of apertures of a water round of FIG. 6 and FIG. 9 according to preferred embodiments of the present invention. Apertures 615 preferably comprise seven apertures A through G, as shown. For purposes of this description, angles herein are measured counterclockwise from Aperture A. Preferably, apertures B, D, E, and G are configured to accept a four-legged cage as shown in FIG. 9. Preferably, aperture B is located about 45 degrees from Aperture A. Preferably, aperture D is located about 135 degrees from Aperture A. Preferably, aperture E is located about 225 degrees from Aperture A. Preferably, aperture G is located about 315 degrees from Aperture A. Preferably, apertures A, C, and F are configured to accept a three-legged cage as shown in FIG. 6. Preferably, aperture C is located about 120-degrees from Aperture A. Preferably, aperture F is located about 240 degrees from Aperture A. Under appropriate circumstances, other angle values of the apertures may suffice.

Figure 8:
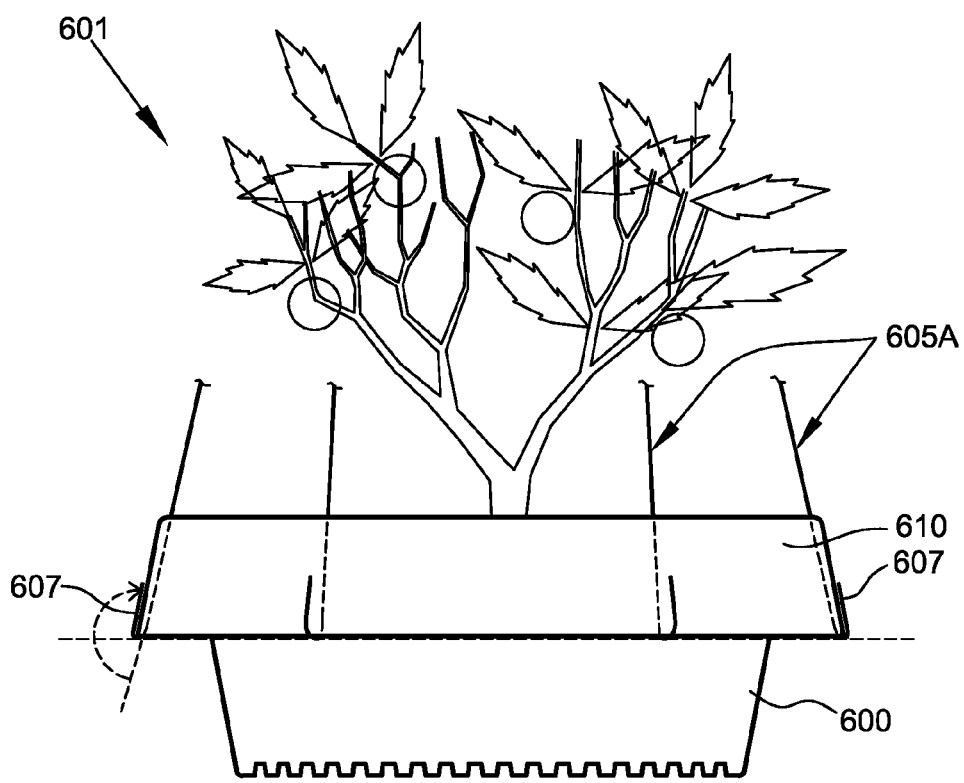
FIG. 8 shows a side view of the water round of FIG. 6 placed into the ground.

FIG. 8 shows a side view of the water round of FIG. 6 placed into the ground. FIG. 8 further illustrates a method of anchoring the legs 607 of cage 605A (shown with four legs) into base 610. In a preferred embodiment, after inserting the leg into the appropriate one of aperture 615, preferably, the legs of cage 605 may be bent (preferably with a tool, such as a pair of pliers) so as to "hook" the base 610, as shown. The bending of the legs 607 of cage 605 assists in anchoring cage 605 relative to base 610, as shown. Alternately preferably, the legs 607 may be pre-bent and inserted from under the base 610. Under appropriate circumstances, other anchoring assistance may suffice, for example, the use of mechanical fasteners to prevent release of the legs from the apertures. The bending of the legs preferably occurs prior to installing base 610 into soil or ground.

FIG. 9 shows a front view of a water round comprising a cage 905 according to another preferred embodiment 900 of the present invention. Embodiment 900 preferably comprises base 910 (system apparatus 101 as shown in FIG. 1B), cage 905, and apertures 915, as shown. Embodiment 900 preferably is similar to water rounds embodiment 601 except for the placement of apertures 915. In embodiment 900 apertures 915 are found penetrating the sidewalls of base 910, as shown. In this arrangement, the ends of the legs 907 of cage 905 are preferably bent so as to insert at a relative right angle relative to the remaining upright leg portion of cage 905 (see FIG. 10), as shown. The legs 907 of cage 905 preferably pass through internal sidewall, through surrounder 110 (see FIG. 1A), and through external sidewall of base 910, as shown. This arrangement provides preferred weight distribution of cage 905 (which will support weight of a vegetable plant or tomato plant) on base 910. Apertures 915 are preferably one-quarter inch in diameter. Under appropriate circumstances, other diameters may suffice. Base 910 is preferably circular in construction with a diameter of about 16 inches. Under appropriate circumstances, other diameters (larger or smaller) of the base may suffice.

Figure 10:
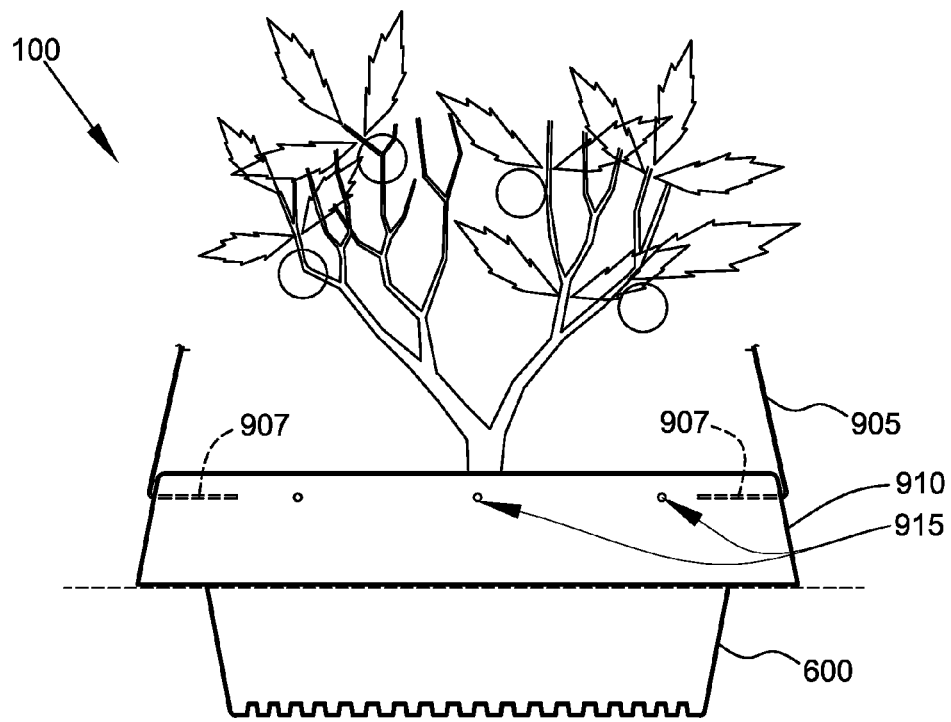
FIG. 10 shows a side view of the water round of FIG. 9 placed into the ground.

FIG. 10 shows a side view of the water round of FIG. 9 placed into the ground. FIG. 10 further illustrates a method of anchoring the legs 907 of cage 905 (only two legs are shown for clarity) into base 910. The ends of the legs 907 of cage 905 are preferably bent into roughly a 90-degree angle with a tool such as a pair of pliers. After bending, the ends of legs are inserted into the appropriate apertures 915 for anchoring. Under appropriate circumstances, other anchoring assistance may suffice, for example, the use of mechanical fasteners to prevent release of the legs from the apertures.

Figure 11:
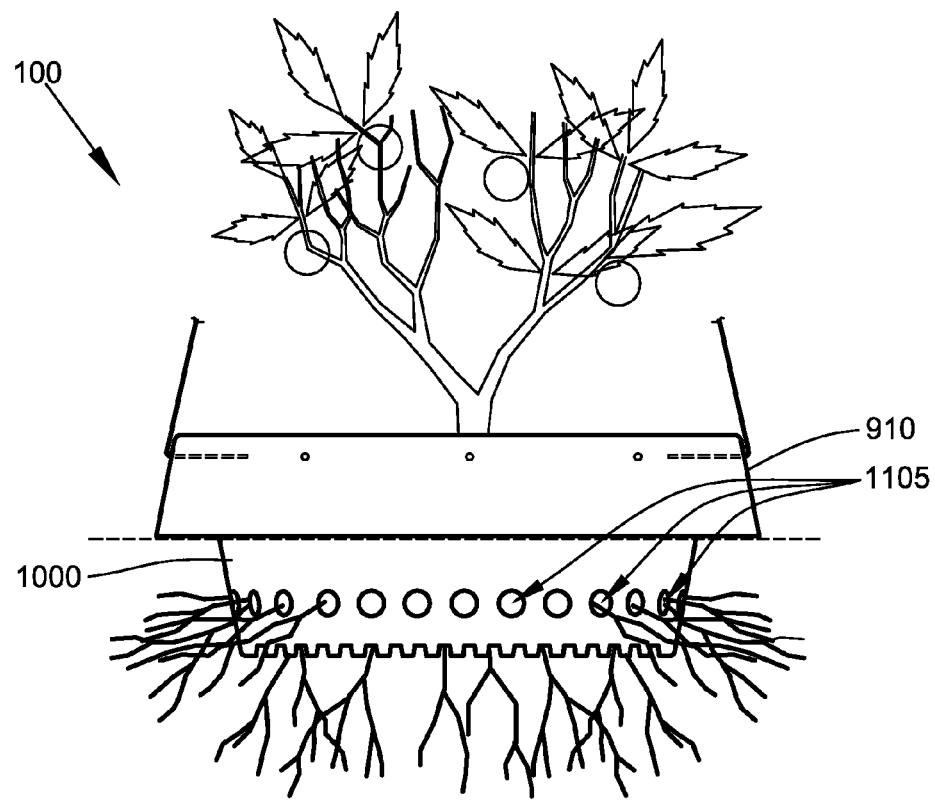
FIG. 11 shows a side view of a water round similar to that of FIG. 8 and FIG. 9 with additional apertures for lateral root expansion, according to a preferred embodiment of the present invention.

FIG. 11 shows a side view of water rounds system embodiments similar to that of FIG. 8 and FIG. 9 with additional apertures for lateral root expansion according to a preferred embodiment of the present invention. Preferably, root expansion apertures 1105 are of sufficient diameter, and are sufficiently placed, so as to allow the roots of the enclosed vegetable plant to expand beyond the perimeter of the water round system without substantial impediment to the plant's growth. Root expansion apertures 1105 preferably comprise one-inch diameter bores in the sidewalls of the water rounds base 1000, as shown. Preferably, root expansion apertures 1105 are regularly spaced along the entire perimeter of the water rounds base 1000. Preferably, the center of each root expansion aperture 1105 is located approximately 2.5 inches from the centers of adjoining apertures, as shown. Upon reading this specification, those with ordinary skill in the art will now appreciate that, under appropriate circumstances, considering such issues as design preference, user preferences, marketing preferences, cost, structural requirements, available materials, technological advances, etc., other aperture arrangements such as, for example, some low, differing diameter apertures, other geometries (square, triangular, etc), slots, etc., may suffice.

FIG. 12 shows a perspective view illustrating another preferred embodiment of water rounds system 100, which may be installed around an existing tree or plant, comprising a connection assembly 1205 according to another preferred embodiment of the present invention. This embodiment comprises a transverse perforation in both base portions 1200 and 1210, creating a transverse separation 1215 in the circular sidewalls. Separation 1215 assists placement of water round assembly 1225 around a tree or large shrub which is otherwise too large to accept an unbroken water round over the top of such plant. After placement around a tree or shrub, separation 1215 in the water round preferably is coupled closed by connection assembly 1205 preferably closely adjoining the circular portion with a preferably butt-joint couple, as shown. Upon reading this specification, those with ordinary skill in the art will now appreciate that, under appropriate circumstances, considering such issues as design preference, user preferences, marketing preferences, cost, structural requirements, available materials, technological advances, etc., other coupling arrangements such as, for example, use to increase the diameter of the water round assembly, maintaining a larger gap when coupled, etc., may suffice.

FIG. 13A shows a perspective view of connection assembly 1205 according to another preferred embodiment of the present invention. Connection assembly 1205 preferably comprises connecting member 1355, pins 1305, and clip 1345, as shown. Connection assembly 1205 preferably provides a rigid connection, preferably sealing separation 1215. Alternately preferably, connection assembly 1205 preferably provides at least a sealed connection (whether rigid, semi-rigid or flexible) sealing separation 1215, as shown. The edges of the sidewall from each respective end of separation 1215 preferably are inserted within the recesses 1330 and 1340 of connecting member 1355, as shown. Pins 1305 are then preferably inserted into apertures 1315 and snapped into place. Separation 1215 preferably is sealed by inserting one penetrator 120 (preferably at least one tooth as shown) from the water round from each side of separation 1215 into the apertures 1350 of clip 1345. Clip 1345 preferably comprises an upper lip that is snapped behind the lower interior lip of the water round, thereby locking clip 1345 in place, as shown. Upon reading this specification, those with ordinary skill in the art will now appreciate that, under appropriate circumstances, considering such issues as design preference, user preferences, marketing preferences, cost, structural requirements, available materials, technological advances, etc., other connection arrangements such as, for example, greater than dual pin arrangements, single pin arrangements, rivets, other fastener arrangements, adhesive attachment, etc., may suffice.

FIG. 13A shows pins 1305 and a connecting member 1355 of the water rounds system 100 of FIG. 12. Connecting member 1355 preferably is a single monolithic piece preferably comprising a shorter portion 1325, a longer portion 1335, and a flexible middle portion 1320, as shown. Longer portion 1355 preferably comprises an inner recess (or channels) 1340 that is sufficiently wide so as to permit insertion of the sidewall (thickness) of a respective water round, as shown.

Preferably, the width of inner recess 1340 is substantially equal to the thickness of the sidewall. Likewise, shorter portion 1325 preferably comprises an inner recess 1330 that is sufficiently wide so as to permit insertion of the sidewall of the water round system. Preferably, the width of inner recess 1330 is substantially equal to the thickness of the sidewall.

The flexible middle portion 1320 preferably comprises two apertures 1315. Preferably, apertures 1315 are sized for use with pins 1305. Pins 1305 preferably comprise smooth thumb-pressed rounded heads and tapered bodies, as shown. Preferably, the tapered bodies of pins 1305 comprise a slight bulge in their midportion, as shown. Preferably, apertures 1315 comprise diameters slightly less than the diameter of the bulging midpoint of pins 1305. Pins 1305 preferably comprise a rust proof material, preferably substantially 100% plastic, alternately preferably, substantially 100% rubber. Upon reading this specification, those with ordinary skill in the art will now appreciate that, under appropriate circumstances, considering such issues as design preference, user preferences, marketing preferences, cost, structural requirements, available materials, technological advances, etc., other material arrangements such as, for example, stainless steel, carbon-fiber, aluminum, wood, etc., may suffice.

FIG. 13B shows a preferred coupler according to the preferred embodiment of FIG. 12. Coupler 1345 preferably comprises an upper lip structured and arranged to engage with the lower interior lip of the water round system. Coupler 1345 further comprises a lower lip comprising two apertures 1350. Apertures 1350 preferably are each large enough to accept one penetrator 120 on the bottom of the water round, as shown. Coupler 1345 preferably comprises a non-rust surface, preferably made of metal, alternately preferably plastic. Upon reading this specification, those with ordinary skill in the art will now appreciate that, under appropriate circumstances, considering such issues as design preference, user preferences, marketing preferences, cost, structural requirements, available materials, technological advances, etc., other material arrangements such as, for example, stainless steel, carbon-fiber, aluminum, wood, etc., may suffice. In use, coupler 1345 preferably adjoins and couples together each respective transverse separation 1215 in the circular sidewalls of base portions 1200 and 1210, preferably creating a sealed separation, as shown.

FIG. 14 shows a cross-sectional view of the section B-B of FIG. 13A. Longer portion 1355 preferably comprises an inner recess 1340 that is sufficiently wide as to permit insertion of the sidewall of the water round system. Preferably, the width of inner recess 1340 is substantially equal to the thickness of the sidewall. Likewise, shorter portion 1325 preferably comprises an inner recess 1330 that is sufficiently wide as to permit insertion of the sidewall of the water round, as shown. Preferably, the thickness of inner recess 1330 is substantially equal to the thickness of the sidewall so as to permit a tight frictional fit.

It is further noted that water rounds system 100, system apparatus 101, base 610, base 910, etc., are preferably made of essentially 100% plastic. Preferably, recycled plastic is used, preferably a copolymer polypropylene. Under appropriate circumstances, other recycled or non-recycled plastics may suffice.

In another preferred embodiment, water rounds system 100, system apparatus 101, base 610, base 910, etc., may be made to resemble materials other than plastic, such as rock, brick, wood, etc. Creating resembling looks would be accomplished using molding techniques and colored plastics to match the item which is to be resembled.

Figure 16:
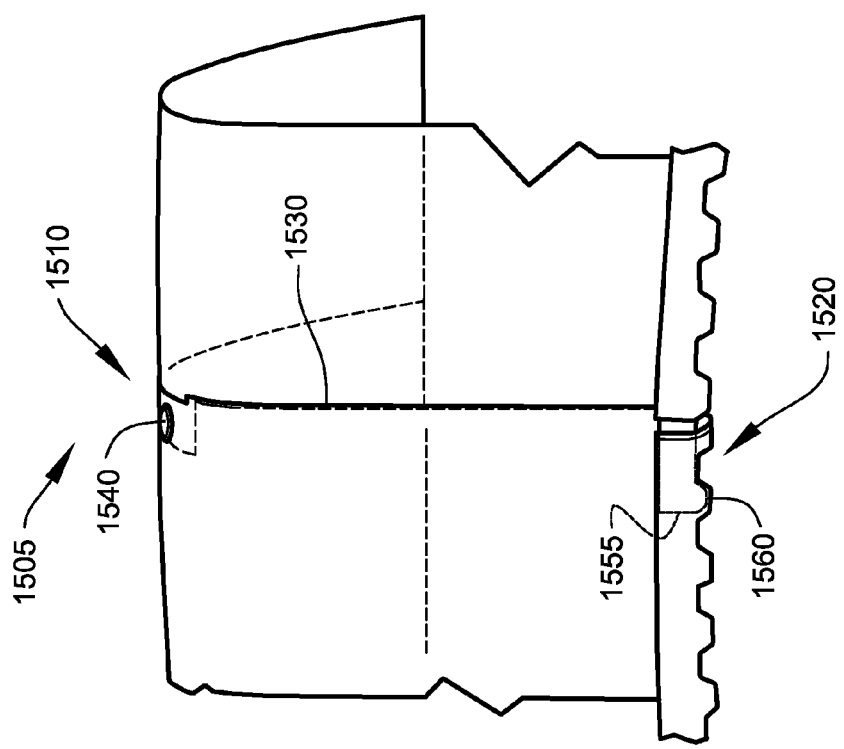
FIG. 16 shows a perspective view of the preferred embodiment of FIG. 15.
Figure 15:
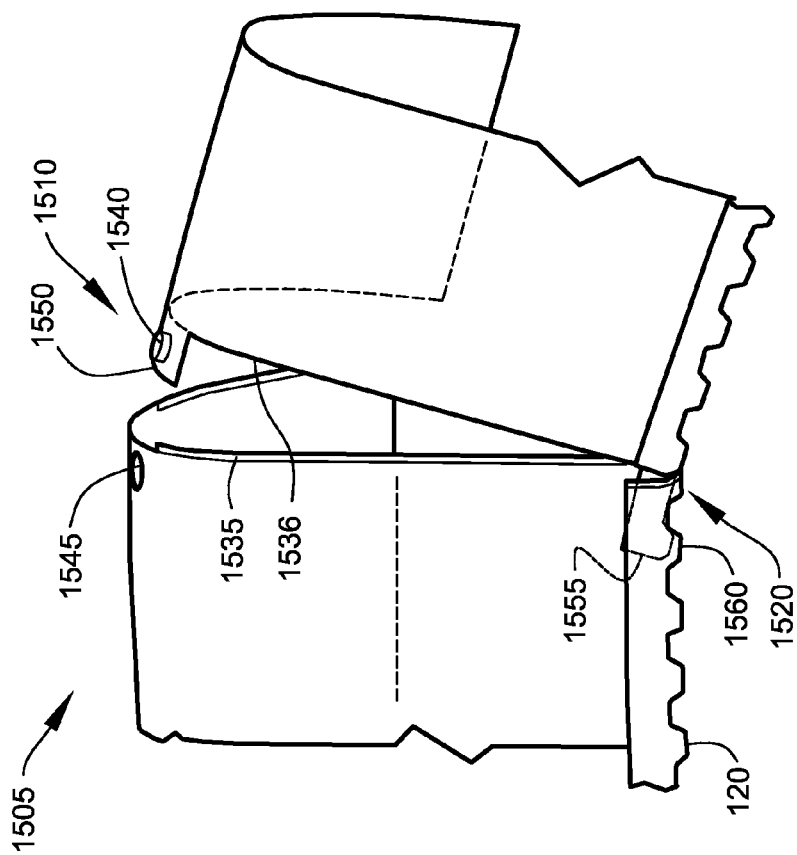
FIG. 15 shows a perspective view of another preferred connector of the water rounds system according to another preferred embodiment of the present invention.

FIG. 15 shows a perspective view of another preferred connector of the water rounds system 100 according to another preferred embodiment of the present invention. FIG. 16 shows a perspective view of the preferred embodiment of FIG. 15. Connection assembly 1505 preferably comprises an overlap joint attachment 1530 in combination with an upper snap-spring button assembly 1510 and a lower tooth and slot assembly 1520, as shown. Connection assembly 1505 preferably provides a coupled connection that couples the two separated portions of the water round together, as shown. Preferably, overlap joint attachment 1530 comprises a respective inner facing lip 1535 and outer facing lip 1536 both preferably comprising about 50% of the thickness of the water round material and extending about one-eighth-inch to about one-quarter-inch outwardly, as shown. Preferably, the two portions inner facing lip 1535 and outer facing lip 1536 overlap each other when placed together, as shown. To maintain each respective portion and a coupled position, the present embodiment utilizes upper snap-spring button assembly 1510 and a lower tooth and slot assembly 1520, as shown.

Upper snap-spring button assembly 1510 comprises a preferably integrally formed button protrusion 1540 that preferably inserts from beneath and preferably upwardly into, aperture 1545, as shown. Preferably, button protrusion 1540 is situated on a tab extension 1550 that preferably is made of flexible material with a spring-like function to allow button protrusion 1540 to be put under and snap into aperture 1545, as shown.

Lower tooth and slot assembly 1520 preferably comprises an extended tooth portion 1555 structured and arranged so as to be able to lock into a recess 1560, preferably a recess above a respective formed penetrator (tooth) 120, as shown. Upon reading this specification, those with ordinary skill in the art will now appreciate that, under appropriate circumstances, considering such issues as design preference, user preferences, marketing preferences, cost, structural requirements, available materials, technological advances, etc., other tooth coupling arrangements such as, for example, in the slot between each respective tooth, etc., may suffice.

Figure 17:
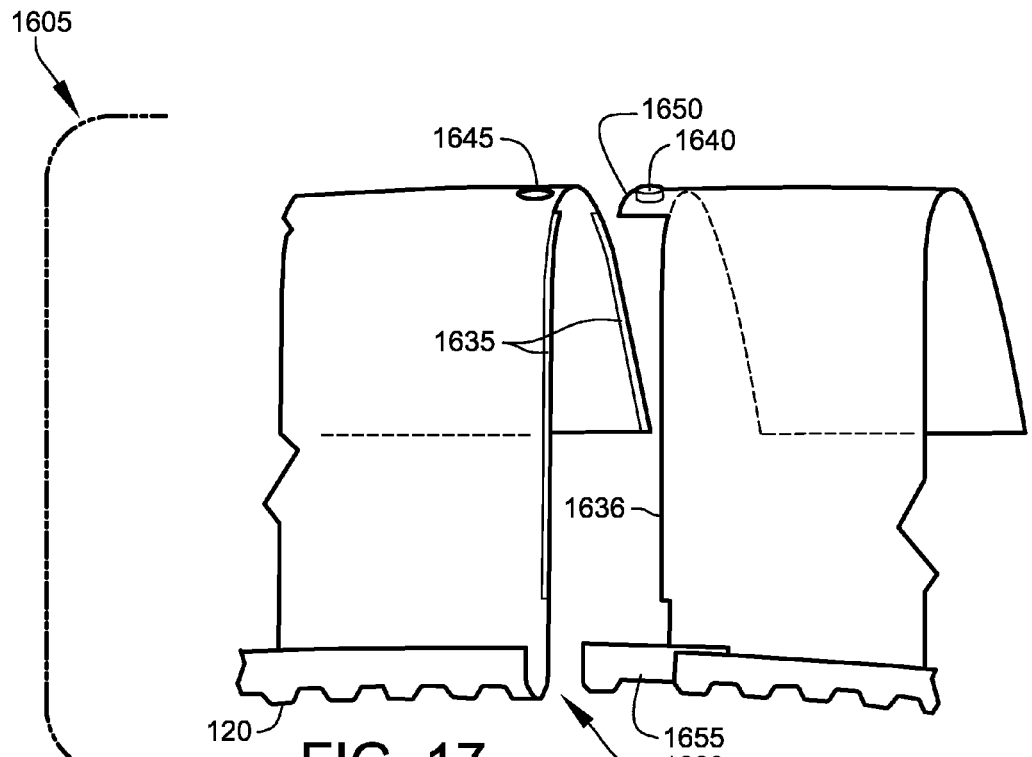
FIG. 17 shows a perspective view of another preferred connector of the water rounds system according to another preferred embodiment of the present invention.
Figure 18:
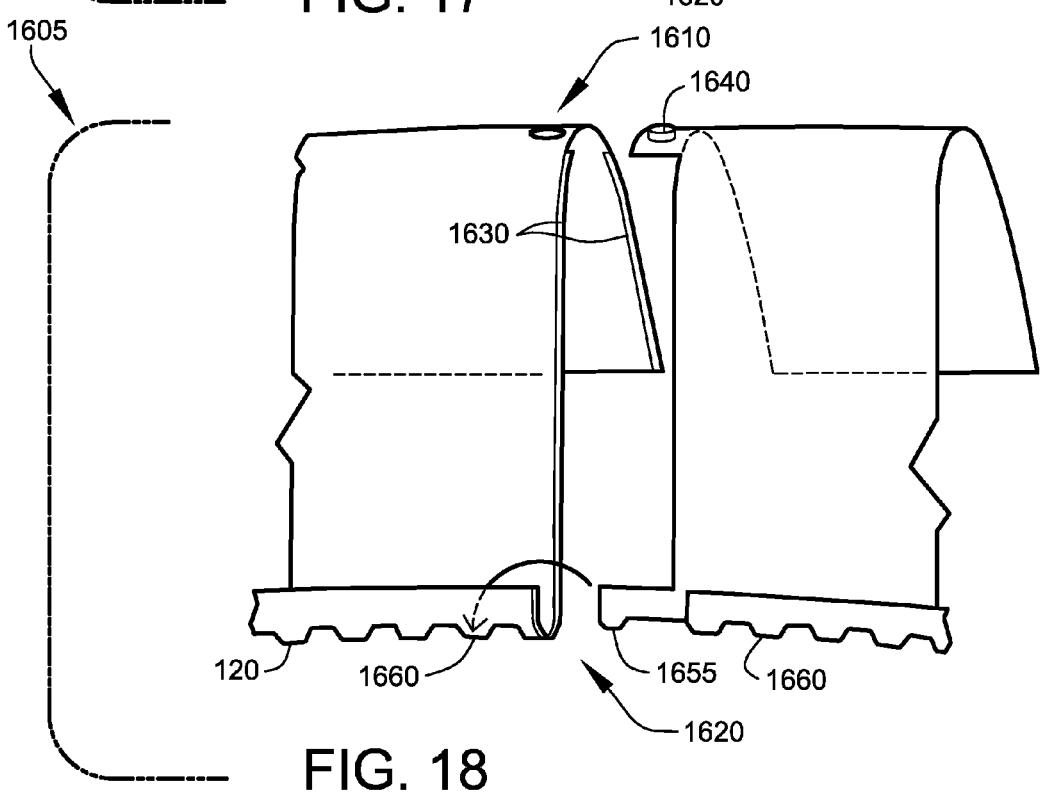
FIG. 18 shows a perspective view of the preferred embodiment of FIG. 17.

FIG. 17 shows a perspective view of another preferred connector of the water rounds system 100 according to another preferred embodiment of the present invention. FIG. 18 shows a perspective view of the preferred embodiment of FIG. 17. Connection assembly 1605 preferably comprises an overlap joint attachment 1630 in combination with an upper snap-spring button assembly 1610 and a lower tooth and slot assembly 1620, as shown. Connection assembly 1605 preferably provides a coupled connection that couples the two separated portions of the water round together, as shown. Preferably, overlap joint attachment 1630 comprises a respective inner facing lip 1635 and outer facing lip 1636, both preferably comprising about 50% of the thickness of the water round material and extending about one-eighth-inch to about one-quarter-inch outwardly, as shown. Preferably, the two portions inner facing lip 1635 and outer facing lip 1636 overlap each other when placed together, as shown. To maintain each respective portion and a coupled position the present embodiment utilizes upper snap-spring button assembly 1610 and a lower tooth and slot assembly 1620, as shown.

Upper snap-spring button assembly 1610 comprises a preferably integrally formed button protrusion 1640 that preferably inserts from beneath and upwardly into, aperture 1645, as shown. Preferably, button protrusion 1640 is situated on a tab extension 1650 that preferably is made of flexible material with a spring-like function to allow button protrusion 1640 be put under and snap into aperture 1645, as shown. Upon reading this specification, those with ordinary skill in the art will now appreciate that, under appropriate circumstances, considering such issues as design preference, user preferences, marketing preferences, cost, structural requirements, available materials, technological advances, etc., other button arrangements such as, for example, extended on a flap, multiple buttons, etc., may suffice.

Lower tooth and slot assembly 1620 preferably comprises an extended tooth portion 1655 structured and arranged so as to be able to lock into at least one recess 1660, preferably a single recess above a respective formed penetrator 120, preferably the second tooth portion from the overlap joint attachment 1630, as shown. Upon reading this specification, those with ordinary skill in the art will now appreciate that, under appropriate circumstances, considering such issues as design preference, user preferences, marketing preferences, cost, structural requirements, available materials, technological advances, etc., other tooth coupling arrangements such as, for example, in the slot between each respective tooth, etc., may suffice.

Further, extended tooth portion 1655 preferably may comprise a separate piece (not integral to the water round base portion) that can lock into a respective recess 1660 on both sides of the overlap joint attachment 1630, as shown.

Additionally, the water rounds systems components described herein may be of larger diameters (or smaller). Preferably water rounds system 100 is preferably about 20 inches in diameter, preferably about 24 inches in diameter, preferably about 36 inches in diameter, and preferably about 48 inches in diameter.

Figure 19:
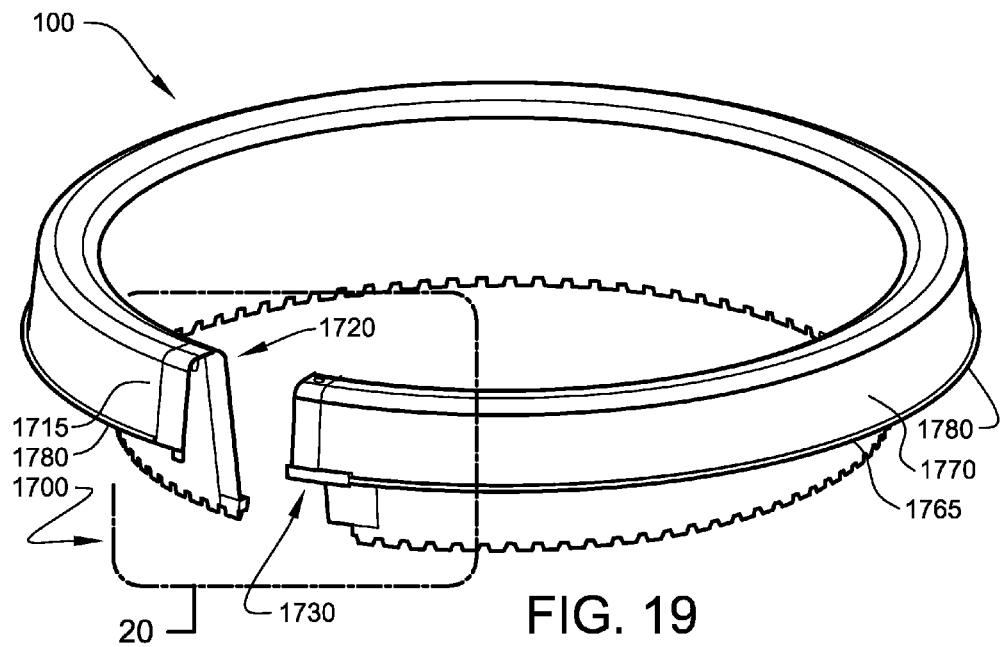
FIG. 19 shows a perspective view of another preferred connector of the water rounds system according to another preferred embodiment of the present invention.
Figure 20:
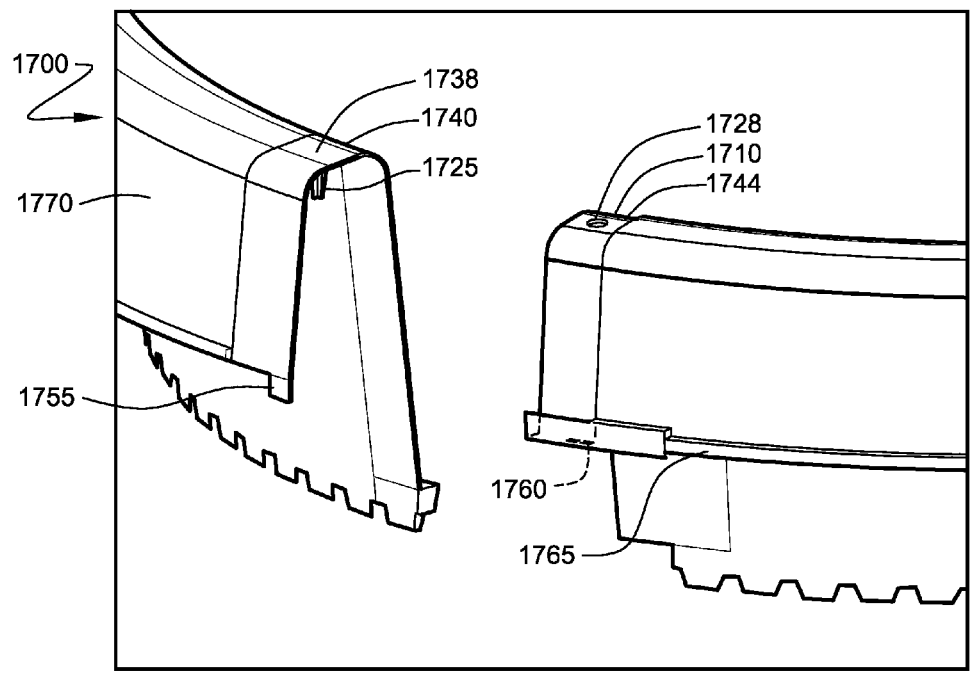
FIG. 20 shows a perspective view of Detail 7 of the preferred embodiment FIG. 19.
Figure 21:
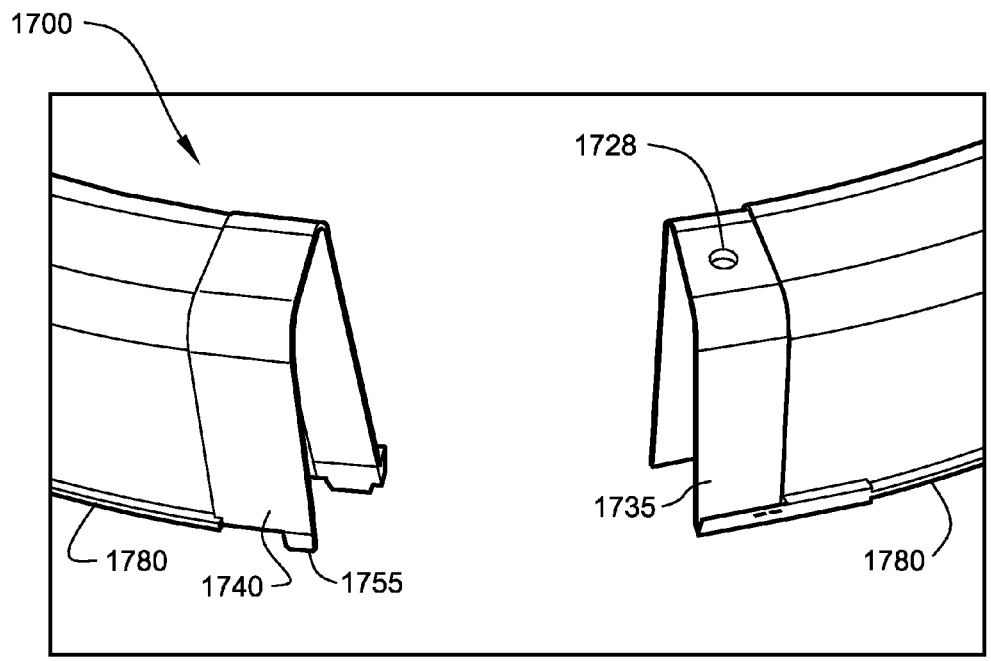
FIG. 21 shows a top view of the preferred embodiment FIG. 19.
Figure 22:
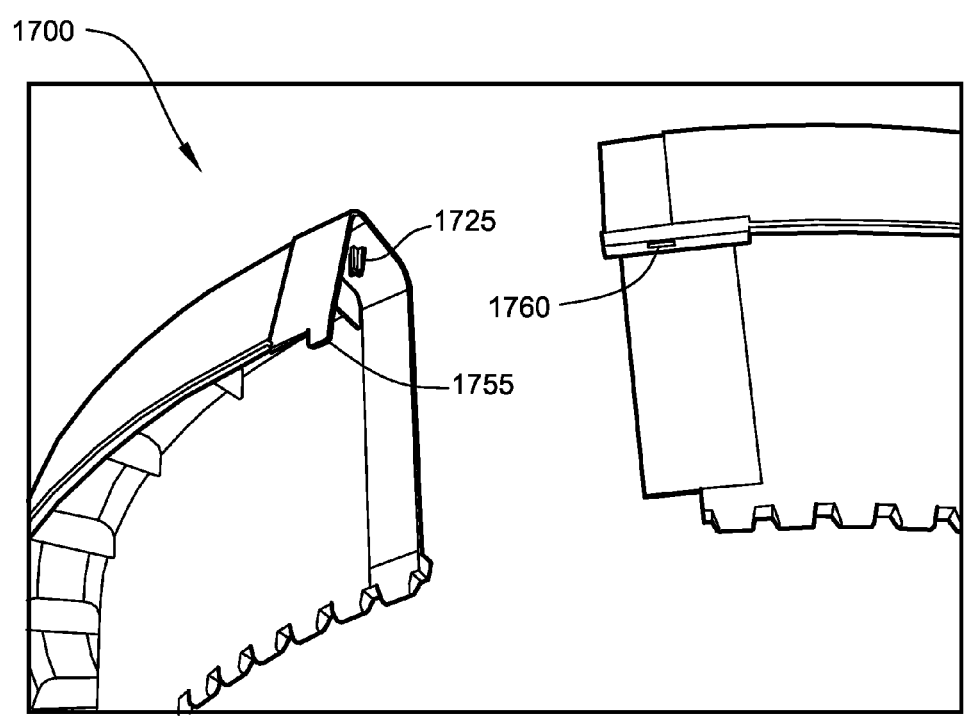
FIG. 22 shows a bottom view of the preferred embodiment of FIG. 19.

FIG. 19 shows a perspective view of another preferred connector assembly of the water rounds system according to another preferred embodiment of the present invention. FIG. 20 shows a perspective view of Detail 20 of the preferred embodiment FIG. 19. FIG. 21 shows a top view of the preferred embodiment of FIG. 19. FIG. 22 shows a bottom view of the preferred embodiment of FIG. 19.

Connector assembly 1700 preferably comprises an overlap joint attachment 1710 in combination with an upper button assembly 1720 and an upper tooth and slot assembly 1730, as shown. Connector assembly 1700 preferably provides a coupled connection that assists coupling the two separated portions of the water round together at the upper portion 1715, as shown. Preferably, overlap joint attachment 1730 comprises a respective inner facing lip 1735 and outer facing lip 1740 both preferably comprising about 50% of the thickness of the water round material and extending about one-eighth-inch to about one-quarter-inch outwardly, as shown. Preferably, the two portions inner facing lip 1735 and outer facing lip 1740 overlap each other when placed together, as shown.

Preferably, upper button assembly 1720 comprises a preferably integrally formed button protrusion 1725 that preferably inserts from above, and preferably downwardly into, aperture 1728, as shown. Preferably, button protrusion 1725 is fixed on the underside of the top 1738 of outer facing lip 1740, as shown. Aperture 1728 preferably is situated on top 1744 of inner facing lip 1735, as shown.

Upper tooth and slot assembly 1730 preferably comprises an extended tooth portion 1755 structured and arranged so as to be able to lock into a recess 1760, preferably a recess along the upper outer rim 1765 of the outer ring portion 1770, as shown. Upon reading this specification, those with ordinary skill in the art will now appreciate that, under appropriate circumstances, considering such issues as design preference, user preferences, marketing preferences, cost, structural requirements, available materials, technological advances, etc., other tooth-coupling arrangements such as, for example, in the slot between each respective tooth, etc., may suffice. Upper outer rim 1765 of the outer ring portion 1770 preferably comprises at least one ridge 1780, preferably circumferential to the entire outer ring portion 1770, preferably assisting rigidity and strengthening of the outer ring portion 1770, as shown.

In use, the separated surrounder 110 is placed around a plantus and connector assembly 1700 comprising an overlap joint attachment 1710 in combination with an upper button assembly 1720 and an upper tooth and slot assembly 1730 is utilized to couple upper portion while coupler 1345 preferably adjoins and couples together each respective transverse separation 1215 in the circular sidewalls of base portions 1200 and 1210, preferably adjoin both upper and lower sections of surrounder 110, creating a sealed separation, as shown (in FIG. 12). Upon reading this specification, those with ordinary skill in the art will now appreciate that, under appropriate circumstances, considering such issues as design preference, user preferences, marketing preferences, cost, structural requirements, available materials, technological advances, etc., other coupling arrangements such as, for example, other combinations of couplings as described herein, other coupling arrangements, etc., may suffice.

FIG. 23 shows a front perspective view of a water round of the water rounds system 100 comprising a cage 605, according to a preferred embodiment of the present invention. FIG. 24 shows an enlarged front perspective view of a water round of the water rounds system 100 utilized with a cage 605, according to a preferred embodiment of FIG. 23. FIG. 25 shows a cross-sectional view of section C-C of FIG. 24. While many of the features of water rounds embodiment 1800 are retained from water rounds embodiment 601, particularly cage 605, apertures 615, surrounder 110 and base 610, base 610 of water rounds embodiment 1800 further comprises at least one surrounding flange 1810 and apertures 1820, as shown.

FIG. 23, FIG. 24, and FIG. 25 show water rounds embodiment 1800. Water rounds embodiment 1800 preferably comprises base 610 (system apparatus 101 as shown in FIG. 1B), cage 605, and apertures 615, as shown. Cage 605 provides a frame ladder or scaffold for plants such as tomato plants, preferably at least tomato plants. Alternately preferably, water rounds embodiment 1800 preferably comprises at least one frame ladder (not necessarily a cage) circumferential with the water round. FIG. 23 shows a three-legged cage. The aperture arrangement (described more particularly in FIG. 7) may also accept a four-legged cage as shown in FIG. 9. Upon reading this specification, those with ordinary skill in the art will now appreciate that, under appropriate circumstances, considering such issues as design preference, user preferences, marketing preferences, cost, structural requirements, available materials, technological advances, etc., other cage arrangements such as, for example, more or less legs, other attachment means, etc., may suffice.

Preferably, base 610 contains preferably seven of apertures 615 arranged on the top portion of base 610, as shown. Upon reading this specification, those with ordinary skill in the art will now appreciate that, under appropriate circumstances, considering such issues as design preference, user preferences, marketing preferences, cost, structural requirements, available materials, technological advances, etc., other aperture arrangements such as, for example, other numbers of apertures, other aperture geometries, etc., may suffice. Under appropriate circumstances, other numbers of apertures 615 may suffice. The apertures are sized to accept the legs of cage 605, as shown. Apertures 615 are preferably about one-quarter inch in diameter. Under appropriate circumstances, other aperture diameters may suffice.

The legs of cage 605 preferably extend into surrounder 110 (see FIG. 1A). In use, water rounds embodiment 1800 is preferably placed into the ground surrounding a tomato plant or vegetable plant to support the growth of the plant. The configuration of base 610 assists in delivering water to the root system of the surrounded plant as discussed herein. Base 610 is preferably circular in construction with a preferred diameter of about 16 inches. Under appropriate circumstances, other diameters (larger or smaller) of base may suffice.

Surrounding flange 1810 (at least embodying herein at least one surrounding flange structured and arranged to surround outer perimeter of such at least one surrounder) preferably extends all the way around the perimeter of outer edge 123, as shown. Surrounding edge 1810 preferably comprises a width, extending radially outward from outer edge 123, of about ⅜ inch (at least herein embodying wherein such at least one surrounding flange comprises a radial width of about ⅜ inch). Apertures 1820 preferably penetrate outer face 1830 of wall 346, as shown. Apertures 1820 preferably are positioned about 1½ inch above outer edge 123.

Structure of surrounding flange 1810 and apertures 1820 preferably permit legs 607 of cage 605 to extend through apertures 615 (at least embodying herein at least one upper aperture) then through apertures 1820 (at least embodying herein at least one lower aperture) and stop against surrounding flange 1810. In use, a user would apply pressure to outer face 1830 of base 610, insert leg 607 through aperture 615 and aperture 1820, then release applied pressure (this arrangement at least herein embodying wherein such at least one upper aperture and such at least one lower aperture align to permit insertion of the leg of the at least one support). Leg 607 preferably then deflects, as shown in FIG. 25, applying a two-point "pinch" on leg 607, preventing easy dislodging of cage 605 from base 610 (this arrangement at least herein embodying wherein such at least one support coupler comprises at least one dual-point leg engager structured and arranged to engage a leg of the at least one support in at least two points; and at least herein embodying wherein such support coupler means comprises dual-point leg engager means for engaging a leg of the at least one support in at least two points). In use, surrounding flange 1810 (at least embodying herein at least one leg stop structured and arranged to stop each leg insertion in such at least one support coupler at a common depth; and at least embodying herein leg stop means for stopping insertion of each leg of the at least one support in such support coupler means at a common depth) prevents legs 607 of cage 605 from being pressed into the soil and prevents tilting of cage 605 from varying penetration of legs 607. This arrangement at least herein embodies wherein such at least one surrounder comprises at least one support coupler structured and arranged to couple with at least one support structured and arranged to assist supporting the at least one plantus; and this arrangement at least herein embodies wherein such surrounder means comprises support coupler means for coupling such surrounder means with at least one support structured and arranged to assist supporting the at least one plantus.

Additionally, as surrounding flange 1810 extends outward from outer edge 123, surrounding flange 1810 preferably further provides stabilization to base 610 when installed in sandy or muddy soil, having a broader edge engaged with the soil (this arrangement at least herein embodies wherein such at least one surrounding flange comprises at least one stabilizer structured and arranged to stabilize such at least one surrounder in unstable soil).

Further, an additional vertical extension on surrounding flange 1810 preferably may be added, not shown. Such vertical extension preferably creates a pocket on surrounding flange 1810 in which leg 607 of cage 605 may engage, preferably preventing slipping beyond the edge of surrounding flange 1810.

Alternately, apertures 1820 preferably are positioned on the interior wall. In this alternate embodiment, leg 607 of cage 605 passes through aperture 615 and aperture 1820 and stop, engaged in anchor 111.

FIG. 26 shows a front perspective view of a water round of the water rounds system 100 comprising a cage 605, according to a preferred embodiment of the present invention. FIG. 27 shows an enlarged front perspective view of a water round of the water rounds system 100 utilized with a cage 605, according to a preferred embodiment of FIG. 26.

While many of the features of water rounds embodiment 1801 are retained from water rounds embodiment 1800, particularly cage 605, apertures 615, surrounder 110, base 610 and apertures 1820, on base 610 of water rounds embodiment 1801 at least one flange tab 1840 replaces surrounding flange 1810, as shown.

FIG. 26 and FIG. 27 shows water rounds embodiment 1801. Water rounds embodiment 1801 preferably comprises base 610 (system apparatus 101 as shown in FIG. 1B), cage 605, and apertures 615, as shown. Cage 605 provides a frame ladder or scaffold for plants such as tomato plants, preferably at least tomato plants. Alternately preferably, water rounds embodiment 601 preferably comprises at least one frame ladder (not necessarily a cage) circumferential with the water round. FIG. 26 shows a three-legged cage. The aperture arrangement (described more particularly in FIG. 7) may also accept a four-legged cage as shown in FIG. 9. Upon reading this specification, those with ordinary skill in the art will now appreciate that, under appropriate circumstances, considering such issues as design preference, user preferences, marketing preferences, cost, structural requirements, available materials, technological advances, etc., other cage arrangements such as, for example, more or less legs, other attachment means, etc., may suffice.

Preferably, base 610 contains preferably seven of apertures 615 arranged on the top portion of base 610, as shown. Upon reading this specification, those with ordinary skill in the art will now appreciate that, under appropriate circumstances, considering such issues as design preference, user preferences, marketing preferences, cost, structural requirements, available materials, technological advances, etc., other aperture arrangements such as, for example, other numbers of apertures, other aperture geometries, etc., may suffice. Under appropriate circumstances, other numbers of apertures 615 may suffice. The apertures are sized to accept legs 607 of cage 605, as shown. Apertures 615 are preferably about one-quarter inch in diameter. Under appropriate circumstances, other aperture diameters may suffice. Legs 607 of cage 605 preferably extend into surrounder 110 (see FIG. 1A). In use, water rounds embodiment 1801 is preferably placed into the ground surrounding a tomato plant or vegetable plant to support the growth of the plant. The configuration of base 610 assists in delivering water to the root system of the surrounded plant as discussed herein. Base 610 is preferably circular in construction with a preferred diameter of about 16 inches. Under appropriate circumstances, other diameters (larger or smaller) of base may suffice.

Flange tab 1840 preferably aligns with apertures 1820. Flange tab 1840 preferably acts similar to surrounding flange 1810 with regard to leg 607 of cage 605, preferably stopping extension of leg 607 beyond flange tab 1840 (at least herein embodying wherein such at least one leg stop comprises at least one flange tab structured and arranged to align with such at least one upper aperture and such at least one lower aperture and extend from outer perimeter of such at least one surrounder) into the soil. As the primary difference between water rounds embodiment 1801 and water rounds embodiment 1800 lies with the alteration of surrounding flange 1810 to flange tab 1840, section D-D and section C-C appear identical in cross-section save for, appropriately, this same alteration. Therefore, FIG. 25 may serve, for general purposes as representative of cross-sections of both C-C and D-D save only in substituting reference number 1840 in place of reference number 1810, to understand section D-D.

Alternately, apertures 1820 preferably are positioned on the interior wall. In this alternate embodiment, leg 607 of cage 605 passes through aperture 615 and aperture 1820 and stop, engaged in anchor 111.

Although applicant has described applicant's preferred embodiments of this invention, it will be understood that the broadest scope of this invention includes modifications such as diverse shapes, sizes, and materials. Additionally, it is understood that where multiple features have been described in conjunction with specific embodiments, combinations of features from multiple embodiments is also envisioned, where such features are not mutually exclusive due to conflicting structure or function. Such scope is limited only by the below claims as read in connection with the above specification. Further, many other advantages of applicant's invention will be apparent to those skilled in the art from the above descriptions and the below claims.

What is claimed is:

1. A system, related to assisting at least one fluid from at least one fluid source to at least one plantus embedded in at least one soil, comprising:
    a) at least one surrounder structured and arranged to radially surround the at least one plantus;
    b) wherein said at least one surrounder comprises at least one container structured and arranged to contain the at least one fluid when said at least one surrounder is embedded in the at least one soil;
    c) wherein said at least one surrounder comprises at least one inner surface extending from a near edge, near the at least one soil, to a far edge, away from the at least one soil;
    d) wherein said at least one surrounder comprises at least one penetrator structured and arranged to penetrate the at least one soil;
    e) wherein said at least one surrounder comprises at least one support coupler structured and arranged to couple with at least one support structured and arranged to assist supporting the at least one plantus; and
    f) wherein said at least one support coupler comprises at least one dual-point leg engager structured and arranged to engage a leg of the at least one support in at least two points, and deflect the leg from linear; and
    g) wherein, when engaged by said at least one dual-point leg engager, the portion of the leg of the at least one support between the at least two points of engagement is made non-linear; wherein said at least one dual-point leg engager comprises:
        i) at least one upper aperture; and
        ii) at least one lower aperture;
        iii) wherein said at least one upper aperture and said at least one lower aperture align to permit insertion of the leg of the at least one support.

2. The system according to claim 1 further comprising the at least one support.

3. The system according to claim 2 wherein said at least one support comprises at least one cage.

4. The system according to claim 1 further comprising at least one leg stop structured and arranged to stop each leg insertion in said at least one support coupler at a common depth.

5. The system according to claim 4 wherein said at least one leg stop comprises at least one surrounding flange structured and arranged to surround outer perimeter of said at least one surrounder.

6. The system according to claim 5 wherein said at least one surrounding flange comprises at least one stabilizer structured and arranged to stabilize said at least one surrounder in unstable soil.

7. The system according to claim 6 wherein said at least one surrounding flange comprises a radial width of about ⅜ inch.

8. The system according to claim 4 wherein said at least one leg stop comprises at least one flange tab structured and arranged to align with said at least one upper aperture and said at least one lower aperture and extend from outer perimeter of said at least one surrounder.

9. The system according to claim 1 wherein said at least one surrounder comprises:
    a) at least one inner face situate on the innermost diameter of said at least one surrounder; and
    b) at least one anchor structured and arranged to anchor said at least one surrounder to the at least one soil;
    c) wherein said at least one anchor is situate along said at least one inner face.

10. The system according to claim 9 wherein said at least one anchor comprises at least one flange situate along said at least one inner face.

11. The system according to claim 10 wherein said at least one flange comprises at least one sloped portion sloping from said at least one inner face to an about v-shaped edge and sloping upwardly and outwardly therefrom to create at least one trough-shaped flange.

12. The system according to claim 1 further comprising at least one stabilizer structured and arranged to stabilize said at least one surrounder in unstable soil.

13. The system according to claim 12 wherein said at least one stabilizer comprises at least one surrounding flange structured and arranged to surround outer perimeter of said at least one surrounder.

14. The system according to claim 13 wherein said at least one surrounding flange comprises a radial width of about 3/8 inch.

15. The system according to claim 1 wherein said at least one surrounder comprises at least one fluid transmitter structured and arranged to transmit at least one fluid from the at least one fluid source.

16. The system according to claim 1 wherein said at least one penetrator comprises at least one tooth.

17. The system according to claim 1 wherein said at least one surrounder comprises at least one nested-stacking geometry structured and arranged to permit nested stacking of a plurality of surrounders.

18. A system, related to assisting at least one fluid from at least one fluid source to at least one plantus embedded in at least one soil, comprising:
   a) surrounder means for radially surrounding the at least one plantus;
   b) wherein said surrounder means comprises container means for containing the at least one fluid when said surrounder means is embedded in the at least one soil;
   c) wherein said surrounder means comprises at least one inner surface extending from a near edge, near the at least one soil, to a far edge, away from the at least one soil;
   d) wherein said surrounder means comprises penetrator means for penetrating the at least one soil;
   e) wherein said surrounder means comprises support coupler means for coupling said surrounder means with at least one support structured and arranged to assist supporting the at least one plantus; and
   f) wherein said support coupler means comprises dual-point leg engager means for engaging a leg of the at least one support in at least two points, and deflect the leg from linear; and g) wherein, when engaged by said dual-point leg engager means, the portion of the leg of the at least one support between the at least two points of engagement is made non-linear; wherein said dual-point leg engager means comprises:
   i) at least one upper aperture; and
   ii) at least one lower aperture;
   iii) wherein said at least one upper aperture and said at least one lower aperture align to permit insertion of the leg of the at least one support.

19. The system according to claim 18 further comprising leg stop means for stopping insertion of a plurality of legs of the at least one support in said support coupler means at a common depth.

* * * * *